(12) United States Patent
Neuendorff et al.

(10) Patent No.: US 7,646,722 B1
(45) Date of Patent: *Jan. 12, 2010

(54) GENERATION OF SYNCHRONOUS TRANSPORT SIGNAL DATA USED FOR NETWORK PROTECTION OPERATION

(75) Inventors: Keith Eric Neuendorff, Petaluma, CA (US); Philippe J. Daniel, Rohnert Park, CA (US)

(73) Assignee: Cisco Technology, Inc., San Jose, CA (US)

( * ) Notice: Subject to any disclaimer, the term of this patent is extended or adjusted under 35 U.S.C. 154(b) by 871 days.

This patent is subject to a terminal disclaimer.

(21) Appl. No.: 10/725,709

(22) Filed: Dec. 2, 2003

Related U.S. Application Data

(63) Continuation of application No. 09/343,122, filed on Jun. 29, 1999, now Pat. No. 6,657,969.

(51) Int. Cl.
  H04L 5/18    (2006.01)
(52) U.S. Cl. ...................................... 370/245
(58) Field of Classification Search ......... 370/221–225, 370/245, 403–406, 464, 465, 907–909, 216, 370/241, 242
See application file for complete search history.

(56) References Cited

U.S. PATENT DOCUMENTS

| | | | |
|---|---|---|---|
| 4,644,532 A | 2/1987 | George et al. ............... 370/255 |
| 4,660,141 A | 4/1987 | Ceccon et al. ................. 710/9 |
| 4,747,100 A * | 5/1988 | Roach et al. ............... 370/452 |
| 4,858,232 A * | 8/1989 | Diaz et al. ................. 370/465 |
| 4,965,790 A * | 10/1990 | Nishino et al. .............. 370/437 |
| 5,042,062 A | 8/1991 | Lee et al. ................. 384/14.11 |
| 5,093,824 A | 3/1992 | Coan et al. .................. 370/228 |
| 5,167,035 A * | 11/1992 | Mann et al. ..................... 714/4 |
| 5,235,599 A | 8/1993 | Nishimura et al. ............. 714/4 |
| 5,278,824 A | 1/1994 | Kremer ...................... 370/223 |
| 5,341,364 A | 8/1994 | Marra et al. ................. 370/223 |
| 5,369,653 A | 11/1994 | Kuroda ....................... 714/819 |
| 5,390,164 A | 2/1995 | Kremer ...................... 370/223 |
| 5,406,401 A | 4/1995 | Kremer ......................... 398/4 |
| 5,408,618 A * | 4/1995 | Aho et al. .................... 710/104 |
| 5,412,652 A | 5/1995 | Lu ............................. 370/223 |
| 5,432,789 A | 7/1995 | Armstrong et al. .......... 370/254 |
| 5,442,620 A | 8/1995 | Kremer ................. 235/462.18 |
| 5,493,689 A | 2/1996 | Waclawsky et al. ............ 710/1 |
| 5,495,484 A * | 2/1996 | Self et al. .................... 370/338 |
| 5,583,991 A | 12/1996 | Chatwani et al. ............ 709/223 |
| 5,586,267 A | 12/1996 | Chatwani et al. ............ 709/223 |
| 5,606,664 A | 2/1997 | Brown et al. ................ 709/224 |

(Continued)

OTHER PUBLICATIONS

Black, TCP/IP and related protocols, McGraw-Hill, 1998, pp. 1,2 and 166-169.*

(Continued)

*Primary Examiner*—Dmitry Levitan
(74) *Attorney, Agent, or Firm*—Campbell Stephenson LLP

(57) ABSTRACT

Each node (130) of a SONET bidirectional line switch ring (BLSR) (120) generates a squelch table. Squelch table generation does not require a separate computer connected to the node. Each node also generates a payload table indicating a type of a synchronous transport signals (STS) on each link (140) in the ring. The payload table allows each node to quickly determine the STS type on the protection channels when a ring switch occurs.

22 Claims, 6 Drawing Sheets

U.S. PATENT DOCUMENTS

| | | | |
|---|---|---|---|
| 5,621,721 A | 4/1997 | Vatuone | 370/394 |
| 5,664,107 A | 9/1997 | Chatwani et al. | 709/224 |
| 5,715,396 A | 2/1998 | Chatwani et al. | 709/242 |
| 5,732,071 A | 3/1998 | Saito et al. | 370/255 |
| 5,742,760 A | 4/1998 | Picazo et al. | 709/249 |
| 5,781,547 A | 7/1998 | Wilson | 370/352 |
| 5,796,736 A | 8/1998 | Suzuki | 370/254 |
| 5,805,568 A * | 9/1998 | Shinbashi | 370/223 |
| 5,812,779 A | 9/1998 | Ciscon et al. | 709/223 |
| 5,835,696 A | 11/1998 | Hess | 714/10 |
| 5,898,686 A | 4/1999 | Virgile | 370/381 |
| 5,928,328 A | 7/1999 | Komori et al. | 709/223 |
| 5,940,376 A * | 8/1999 | Yanacek et al. | 370/250 |
| 5,949,755 A * | 9/1999 | Uphadya et al. | 370/224 |
| 5,963,943 A | 10/1999 | Cummins et al. | 707/10 |
| 5,968,130 A | 10/1999 | Okanoue et al. | 709/238 |
| 5,987,026 A * | 11/1999 | Holland | 370/353 |
| 5,999,536 A | 12/1999 | Kawafuji et al. | 370/401 |
| 6,009,075 A | 12/1999 | Roberts et al. | 370/219 |
| 6,026,086 A | 2/2000 | Lancelot et al. | 370/353 |
| 6,094,687 A | 7/2000 | Drake et al. | 709/241 |
| 6,122,250 A * | 9/2000 | Taniguchi | 370/222 |
| 6,130,887 A | 10/2000 | Dutta | 370/347 |
| 6,260,062 B1 | 7/2001 | Davis et al. | 709/223 |
| 6,285,192 B1 | 9/2001 | Bley et al. | 324/460 |
| 6,301,254 B1 | 10/2001 | Chan et al. | 359/115 |
| 6,347,336 B1 | 2/2002 | Song et al. | 709/223 |
| 6,349,096 B1 | 2/2002 | Liu et al. | 370/352 |
| 6,366,556 B1 * | 4/2002 | Ballintine et al. | 370/216 |
| 6,385,179 B1 | 5/2002 | Malcolm et al. | 370/329 |
| 6,389,036 B1 | 5/2002 | Stewart et al. | 370/466 |
| 6,389,119 B1 | 5/2002 | McBride | 379/93.01 |
| 6,393,472 B1 | 5/2002 | Anerousis et al. | 709/223 |
| 6,418,476 B1 | 7/2002 | Luciani | 709/238 |
| 6,434,140 B1 | 8/2002 | Barany et al. | 370/352 |
| 6,463,040 B1 | 10/2002 | Dutta | 370/280 |
| 6,535,489 B1 | 3/2003 | Merchant et al. | 370/244 |
| 6,535,529 B1 * | 3/2003 | Ichihashi | 370/535 |
| 6,587,470 B1 | 7/2003 | Elliot et al. | 370/404 |
| 6,614,785 B1 | 9/2003 | Huai et al. | 370/352 |
| 6,631,134 B1 | 10/2003 | Zadikian et al. | 370/395.21 |
| 6,657,969 B1 | 12/2003 | Neuendorff et al. | 370/245 |
| 6,674,771 B1 | 1/2004 | Taniguchi | 370/505 |
| 6,731,654 B1 | 5/2004 | Champion et al. | 370/503 |
| 6,788,681 B1 | 9/2004 | Hurren et al. | 370/389 |
| 6,795,917 B1 | 9/2004 | Ylonen | 713/160 |
| 6,847,644 B1 | 1/2005 | Jha | 370/392 |
| 6,870,813 B1 | 3/2005 | Raza et al. | 370/238 |
| 2002/0004828 A1 | 1/2002 | Davis et al. | 709/223 |

OTHER PUBLICATIONS

Goralski, W., *Sonet: A Guide to Synchronous Optical Network*, McGraw-Hill 1997, Chapter 9, pp.

Hari, G. and Dempsey, D., "Requirements for Bidirectional Line Switched Ring Map Generation Protocol," SONET Interoperability Forum (SIF), Contribution No. SIF-AR-9807-111, draft document, Jul. 27, 1998, pp. 1-5.

Henderson, J., "Questions on Autodiscovery of Ring Topology (SIF-AR-9804-057R2),"SONET Interoperability Forum (SIF), Contribution No. SIF-AR-9812-194, Dec. 1998, 4 pages.

Hunt, C. "BLSR Interworking—Autodiscovery of Ring Topology, "SONET Interoperability Forum (SIF), Contribution No. SIF-AR-9804-057R1, draft documents, Jun. 16, 1998, pp. 1-12.

Hunt, C. "BLSR Interworking—Autodiscovery of Ring Topology, "SONET Interoperability Forum (SIF), Contribution No. SIF-AR-9804-057R2, draft documents, Oct. 6, 1998, pp. 1-18.

Hunt, C., "BLSR Interworking—Autodiscovery of Ring Topology, "SONET Interoperability Forum (SIF), Contribution No. SIF-AR-9804-057R3, draft documents, Feb. 7, 1999, pp. 1-26.

Walsh, A., "Network Level Protection Glossary," SONET Interoperability Forum (SIF), Contribution No. SIF-IM-9805-082, May 28,1998, pp. 1-7.

Wirbel, L., "Cerent offers a hybrid Sonet," EE Times Online, Feb. 17, 1999, (http:///www.eetimes.com/story/OEG19990217S0028), May 3, 1999, 2 pages.

Wu, L, "BLSR Interoperability Requirements—Cross Connect, Squelch Table and Nut," SONET Interoperability Forum (SIF), Contribution No. SIF-AR-9806-085, draft documents, Mar. 28, 1998, pp. 1-10.

About the Cerent 454, Cerent Corporation Web Site (http//www.cerent.com/products/cerent454 cfm), (Mar. 4, 1999), 2 pages.

Fujitsu FLM 2400 ADM Lightweight Multiplexer, Fujitsu Business Communication Systems Web Site (http://www.fbcs.com/products/sonet/2400adm.asp), (Apr. 7, 1999) 3 pages.

Goralski, Walter J., "SONET a Guide to Synchronous Optical Networks", McGraw-Hill, 1977, Chapter 11, pp. 302-339.

Information about Tornado for Managed Switches Software from WindRiver Systems' website, www.wrs.com, 4 pages., Oct. 28, 1999.

Bellcore GR-253-CORE Issue 2, Dec. 1995, Revision 2, Jan. 1999, pp. 8-1 to 8-8, 8-31 to 8-36.

Huai, Jin, et al., U.S. Appl. No. 10/620,021, filed on Jul. 15, 2003, entitled "Automatic Propagation of Circuit Information in a Communications Network.".

Roberson, Charles S, et al., U.S. Appl. No. 09/727,905, filed on Nov. 30, 2000, entitled "Method and Apparatus For Transporting Network Management Information in a Telecommunications Network.".

* cited by examiner

GENERATION OF SYNCHRONOUS TRANSPORT SIGNAL DATA USED FOR NETWORK PROTECTION OPERATION

CROSS REFERENCE TO RELATED APPLICATIONS

This application is a Continuation of patent application Ser. No. 09/343,122, entitled "GENERATION OF SYNCHRONOUS TRANSPORT SIGNAL DATA USED FOR NETWORK PROTECTION OPERATION", filed Jun. 29, 1999 now U.S. Pat. No. 6,657,969, and having Keith Eric Neuendorff and Phillippe J. Daniel as inventors. This application is assigned to Cisco Technology, Inc., the assignee of the present invention, and is hereby incorporated by reference, in its entirety and for all purposes.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

The present application contains a microfiche Appendix A. The total number of microfiche in Appendix A is 3 sheets. The total number of frames in Appendix A is 258.

BACKGROUND OF THE INVENTION

The present invention relates to networks, and more particularly to generation of data used for network operation.

In some networks, network nodes store data which they use for proper operation. One example is squelch tables used in SONET rings. See Bellcore Generic Requirements document GR-1230-CORE (Issue 4, December 1998) incorporated herein by reference. In SONET, data between adjacent nodes are transmitted in modules called STS's (synchronous transport signals). Each STS is transmitted on a link at regular time intervals (for example, 125 microseconds). If a failure occurs, an STS may have to be squelched to prevent misconnection. To accomplish squelching, a node in a SONET ring stores a squelch table. For each STS handled by the node, the squelch table specifies a node on which the STS is dropped, and a node on which the STS is added. If an STS contains sub-STS structures such as virtual tributaries (VT's), the squelch table specifies, for each VT handled by the node, a node on which the VT is dropped and a node on which the VT is added.

Manual generation of squelch tables is a cumbersome and error-prone task. Therefore, squelch tables have been generated automatically. A separate computer, (for example, a UNIX station) can be connected to a node. The node requests data from other nodes regarding the STS's added and dropped on the other nodes, and provides these data to the computer. The computer constructs a squelch table for each node on the ring. The computer sends the squelch tables to the node to which the computer is connected. This node distributes the squelch tables to the other nodes on the ring.

It is desirable to facilitate generation of data used for network operation, and make the data generation more robust.

When failure occurs in a SONET ring, traffic can be switched from a "working" channel to a "protection" channel (a redundant channel) and transmitted in the opposite direction on the ring. When a SONET node receives traffic on the protection channel, the node may have to determine the format of the traffic to process the traffic correctly. For example, the node may have to extract the payload and re-transmit the payload further down the ring. The position of the payload in the SONET frame is defined by the frame's overhead pointers. The pointers' position in the frame depends on the type of the STS (e.g., a SONET OC48 link can carry an STS of type STS-48C or four byte-interleaved STS's of type STS-12C; the pointers' position will be different in each of these cases). Therefore, the node has to know the STS type.

Determining the STS type on the protection channel must be done quickly to avoid data loss or corruption. Quickly determining the STS type is a burden on the node's circuitry.

It is desirable to provide techniques that would allow a network node to quickly and easily determine STS types on protection channels.

SUMMARY

In some embodiments, each node generates data to be used for network operation. Therefore, failure of one node does not prevent data generation on other nodes. The network becomes more robust as a result.

Further, in some embodiments, each node generates the data. The data is not generated by a separate computer, and further the node generating the data need not be connected to a separate computer.

The invention is not limited to the features described above, or to any particular type of network. In some embodiments, the network satisfies at least one of the following conditions (A) and (B):

(A) in case of failure, traffic can be switched from one link to one or more other links, and when traffic is switched traffic can be squelched to prevent misconnection;

(B) data on each link are transmitted in data buckets, each data bucket being re-transmitted at regular intervals of time, each data bucket, when re-transmitted, being dropped on the same predetermined one or more nodes from the network.

One example of a data bucket is SONET's STS or VT (virtual tributary). Another example is SDH's STM (synchronous transport module) or VC (virtual container). SDH (synchronous digital hierarchy) is described in O. Kyas, "ATM networks" (1995), incorporated herein by reference. See also W. J. Goralski, "SONET" (1997), incorporated herein by reference.

The node contains storage for storing "first" data (e.g. squelch tables), wherein for data received from the node's one or more ports and/or transmitted on the one or more ports, the first data identifies at least one of other nodes on which the data is added to the network and/or at least one of other nodes on which the data is dropped from the network. An example of first data is a squelch table. The node generates the first data using circuitry which, besides generating the first data, also performs real time processing to accomplish communication of the node with the other nodes.

According to another aspect of the invention, a node has a cabinet containing circuitry for communicating with one or more other nodes over a network. The network satisfies at least one of the above conditions (A) and (B). The first data described above is generated by the circuitry in the cabinet and not by any circuitry outside the cabinet (e.g. not by a computer outside the cabinet).

According to another aspect of the invention, each node in the network generates the first data described above.

According to another aspect of the invention, each SONET ring node determines the STS types on SONET links not attached to the node. Each node determines the STS types in advance, before failure occurs. Each nodes stores the STS types in its storage. When a ring switch occurs, the switching procedures described in GR-1230-CORE inform ring nodes which node is switching traffic to a protection channel. Since the non-switching nodes already have in their storage the STS type on the link from which the traffic is being switched to the protection channel, the non-switching nodes know the STS type on the protection channel. Determining the STS type on the protection channel is thus quick and easy.

In some embodiments, to determine the STS types on links not attached to the node itself, the node requests other nodes to provide the STS types on links attached to the other nodes.

The invention is not limited to SONET embodiments. In some embodiments, in case of failure, traffic which is to be transmitted through a link not attached to a node can instead be re-directed and transmitted through the node. The node generates format information which indicates format of data on one or more links not attached to the node. (An STS type is one example of format information.) The format information will be used by the node in case of failure to process traffic which becomes transmitted through the node instead of one or more links not attached to the node. The format information is generated before the failure occurs.

Other embodiments and variations are within the scope of the invention, as defined by the appended claims.

DESCRIPTION OF PREFERRED EMBODIMENTS

Figure 1:
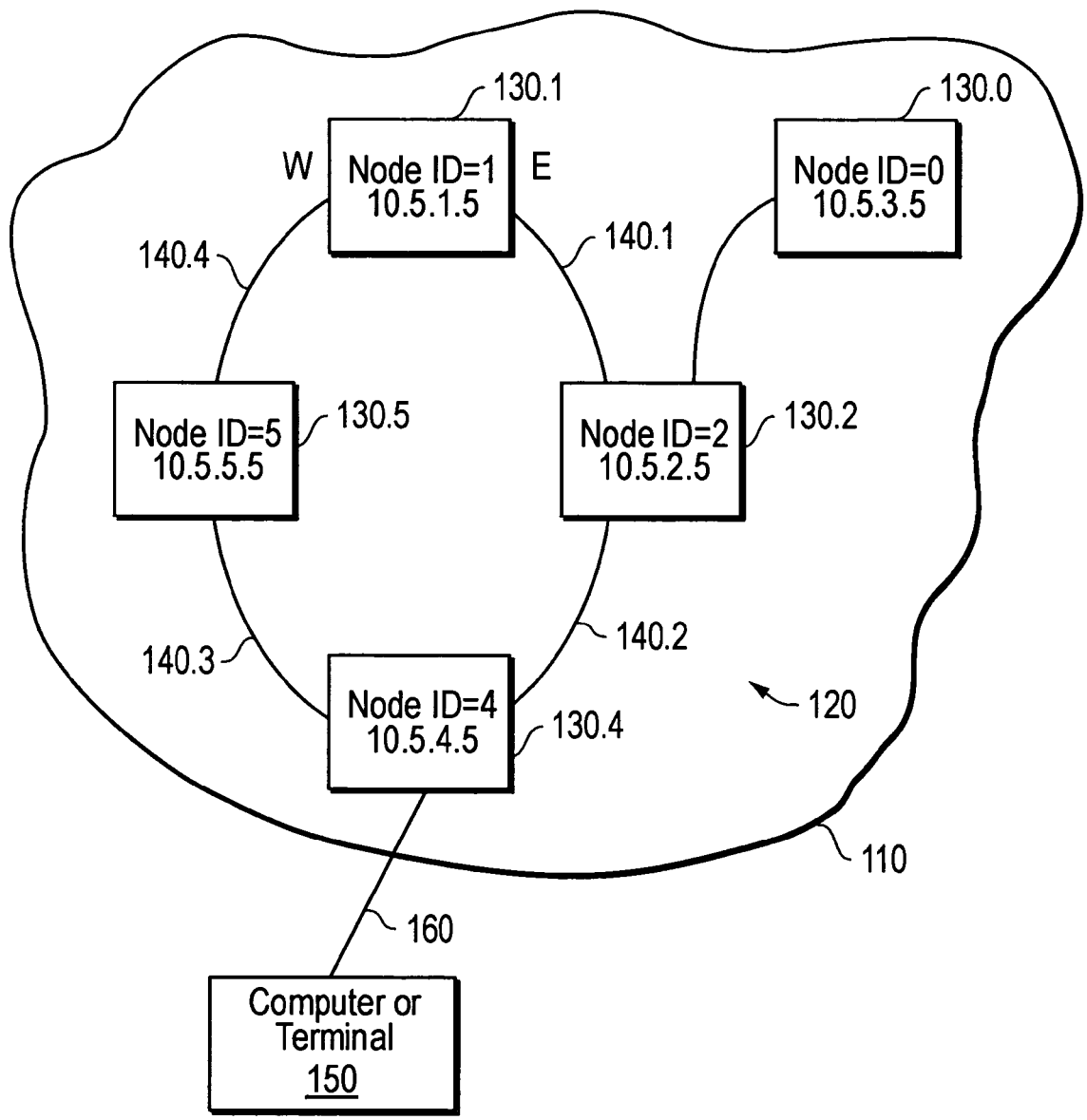
FIG. 1 is a block diagram of a network in which an embodiment of the present invention is implemented.

FIG. 1 illustrates a SONET network 110, which may or may not be part of a larger network. Network 110 includes a SONET ring network 120 made of nodes (network elements, or NEs) 130.1, 130.2, 130.4 and 130.5. These nodes are interconnected by optical fiber links 140.1 through 140.4. Each link 140 is an optical fiber link or a series of links connected together by regenerators (not shown).

Node 130.2 is connected by another optical fiber link to a SONET node 130.0. Node 130.0 may or may not be part of another SONET ring. Each node 130.1-130.4 may also be part of another SONET ring.

Each node is assigned a node ID and an IP address. In FIG. 1, the node ID of node 130.i is "i", and we will sometimes refer to node 130.i as "node i". The IP addresses are shown in each node. In some embodiments, the IP addresses are provided only to manage the SONET network 110. The IP addresses have no meaning outside the network 110. In other embodiments, one or more of the IP addresses may be used outside the network 110. For example, in FIG. 1 node 130.4 is connected to a personal computer 150 via a link 160. This link may be a LAN (local area network) link. In that case, the IP addresses of nodes 130 could be used for communication with the LAN.

In some embodiments, SONET ring 120 is a BLSR (bidirectional line switch ring). BLSRs are described in Bellcore generic requirements document GR-1230-CORE (Issue 4, December 1998) incorporated herein by reference. Each node 130 stores a ring map. The ring map has the IP address and the node ID for each ring node. A ring map example for ring 120 is given in the following Table 1.

TABLE 1

| RING MAP | |
|---|---|
| Node IP Address | Node ID |
| 10.5.1.5 | 1 |
| 10.5.2.5 | 2 |
| 10.5.4.5 | 4 |
| 10.5.5.5 | 5 |

Each node 130 also stores a squelch table which contains, for each STS (synchronous transfer signal) incoming or outgoing at the node, information on where the STS is added and where it is dropped. An example squelch table for node 130.1 is shown in the following Table 2.

TABLE 2

| | SQUELCH TABLE | | | |
|---|---|---|---|---|
| | East | | West | |
| STS number | Incoming | Outgoing | Incoming | Outgoing |
| 1 | 4 | 4 | 1 | 2 |
| 2 | 5 | | 2 | 2 |
| 3 | | 1 | 1 | |

In the example of FIG. 1, the East direction is clockwise. Table 2 shows, for example, that the STS number 1 incoming on the East interface is added at node 4. The outgoing STS number 1 is dropped at node 4. This is a typical bidirectional STS between nodes 130.1 and 130.4.

Further, Table 2 shows for node 1 that the outgoing STS number 3 is dropped at node 1. This it typical for a broadcast. Correspondingly, the incoming STS number 3 on the West interface is added on node 1.

Blank spaces in Table 2 mean an unequipped STS.

In some embodiments, each node also has a payload table. The payload table contains the type (for example, STS1, STS3C, STS12C or UNEQUIPPED) of each STS in the ring. An example payload table is Table 3 below. This example shows three STSs per interface. In some embodiments, the payload table has entries for only the outgoing or the incoming STSs, but not for both.

TABLE 3

| PAYLOAD TABLE | | | |
|---|---|---|---|
| Node ID | STS number | East | West |
| 1 | 1 | STS1 | STS3C |
| 1 | 2 | STS1 | STS3C |
| 1 | 3 | STS1 | STS3C |
| 2 | 1 | STS1 | STS1 |
| 2 | 2 | STS1 | STS1 |
| 2 | 3 | STS1 | STS1 |
| 4 | 1 | UNEQ | STS1 |
| 4 | 2 | STS1 | STS1 |
| 4 | 3 | STS1 | STS1 |
| 5 | 1 | STS3C | UNEQ |
| 5 | 2 | STS3C | STS1 |
| 5 | 3 | STS3C | STS1 |

The payload table is used by the nodes' interface cards 210 (i.e. cards 210.1, 210.2, etc.; see FIG. 2) to configure their hardware during a ring switch (automatic protection switch). During normal operation, if no extra traffic is carried on the protection STSs, those STSs are not configured. They are configured on the fly when a ring switch occurs.

Each node 130 in ring 120 can generate the ring map, the payload table, and the squelch table for the node. As a result, the network is more robust.

Figure 2:
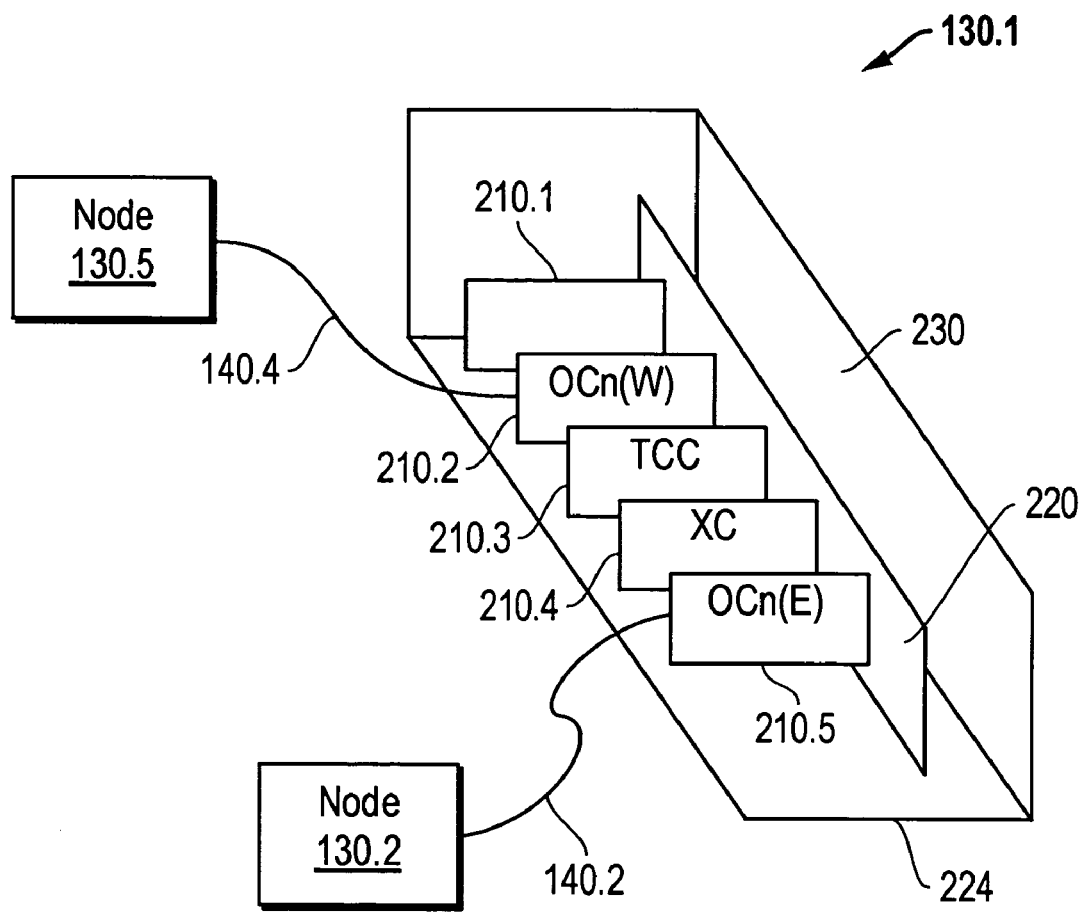
FIG. 2 is a block diagram of a network node of FIG. 1.

FIG. 2 illustrates node 130.1 in more detail. The other nodes 130 may be similar. In each node, a number of cards 210.1, 210.2, . . . are plugged into backplane 220. Backplane 220 is a printed circuit board or of some other construction. The cards 210 and the backplane are located in cabinet 224 and are at least partially enclosed in the cabinet's housing 230. Card 210.2 provides an electrical-optical interface to the West OCn link 140.4. Similarly, card 210.5 provides an interface to the East OCn link 140.2. Card 210.1 is connected to a DS1, DS3, OCn, Ethernet, EC1, or some other link (not shown). A node 130 may have a number of such cards 210.1 connected to different kinds of links. For example, multiple Ethernet and DS1 links can be connected to the same node. On the other hand, some nodes may have no such cards.

Cross connect (XC) card 210.4 provides a switching fabric for node 130. XC card 210.4 switches traffic between different traffic cards 210.1, 210.2, and 210.5.

Timing Communications and Control (TCC) card 210.3 performs system initialization, provisioning, alarm reporting, maintenance, diagnostics, IP address detection/resolution, processing of SONET DCC (Data Communication Channel) information, and system fault detection for node 130. TCC card 210.4 supports multichannel HDLC processing for SONET's Data Communication Channels (DCCs). A number of DCCs (up to 48 in some embodiments) may be routed to and from TCC card 210.3. TCC card 210.3 also originates and terminates a cell bus (not shown). The cell bus in backplane 220 supports links between any two cards 210 in the node.

TCC card 210.3 includes a non-volatile memory 310 (FIG. 3) which stores the node's database 320. The database stores the ring map, the squelch table, the node's ID, and the node's IP address. Memory 310 also stores table generation software and other software. Storing these data on the TCC card allows quick recovery in the event of power loss or some other failure.

TCC card 210.3 monitors the recovered clocks from each traffic card and possibly from other interfaces for frequency accuracy. The card selects one of the clocks as the system timing reference.

TCC card 210.3 includes a LAN port through which the node 130.1 can be connected to computer 150 (FIG. 1). Computer 150 can be used to configure the node. TCC card 210.3 also includes an RS232 port for connection to a computer or a computer terminal that could be used to configure the node. However, the node does not have to be connected to any external computer or terminal, since the node can be configured remotely via another node 130. For example, in FIG. 1, node 130.1 can be configured from personal computer 150 via node 130.4.

Some nodes 130 may include two or more TCC cards, or two or more XC cards, for redundancy.

In some embodiments, nodes 130 are of type Cerent 454 (trademark) available from Cerent Corporation of Petaluma, Calif. and described in "Cerent 454 User Documentation", Release 1.0 (Cerent Corporation, February 1999) incorporated herein by reference. However, the invention is not limited to nodes of type Cerent 454, or to the number or type of cards 210, any structure of backplane 220, or to any other particular feature of the system of FIGS. 2 and 3. The invention is also not limited to any particular division of tasks between different cards 210, or even to being constructed from cards or having a backplane.

Figure 3:
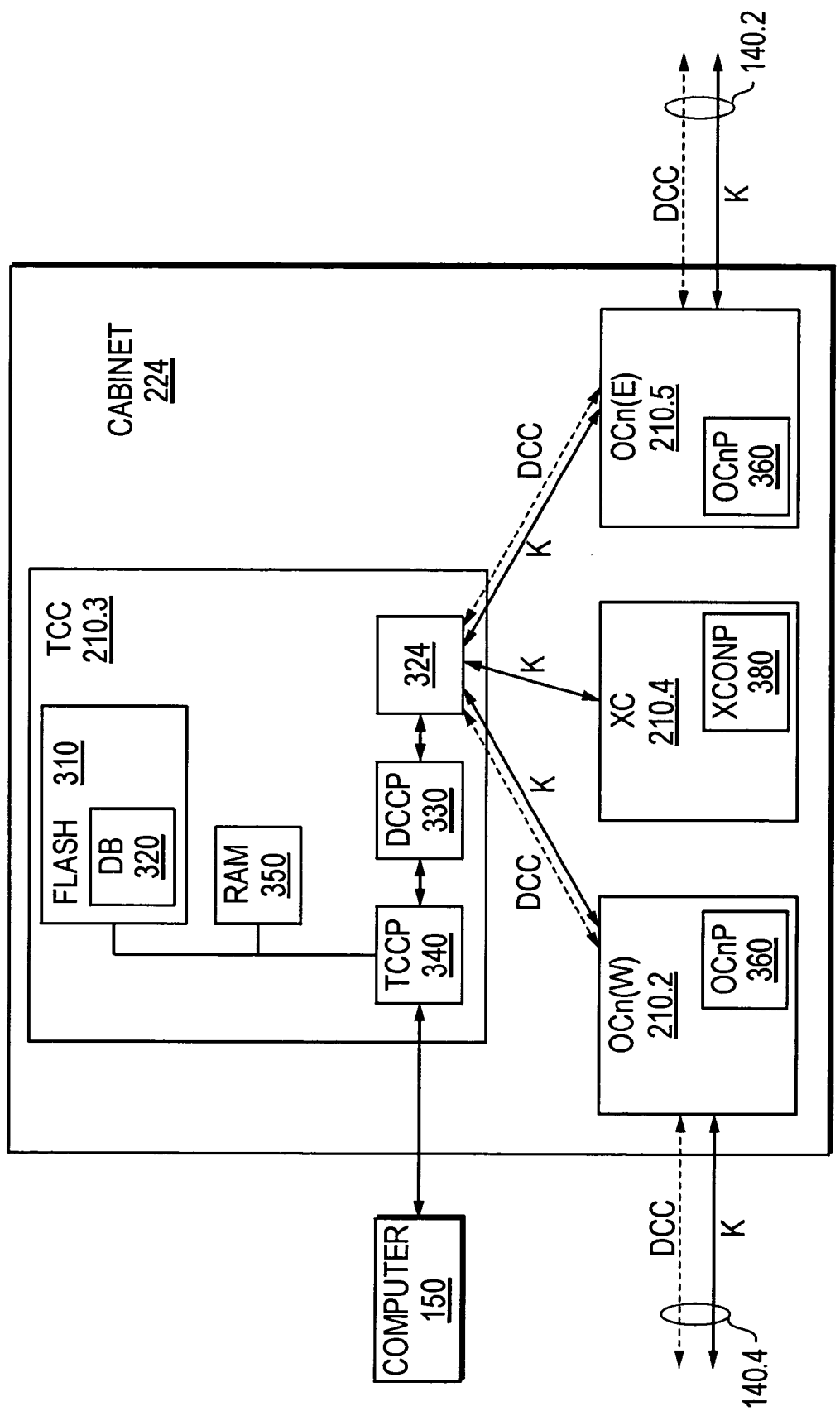
FIG. 3 is a block diagram illustrating some details of the node of FIG. 2.

FIG. 3 illustrates additional features of one embodiment of node 130.1. The other nodes 130 may be similar. Dashed arrows indicate the path of the DCC data through the node. Arrows marked "K" indicate the path of the K bytes, that is, the bytes K1 and K2, used for automatic protection switching. See the aforementioned document GR-1230-CORE incorporated herein by reference. FIG. 3 assumes a two-fiber BLSR, although other embodiments include four-fiber BLSRs and, perhaps, other ring and non-ring topologies, including topologies not yet invented.

In TCC card 210.3, a circuit 324 transfers DCC data between East and West optical interface cards 210.2, 210.5 on the one hand, and a DCC processor (DCCP) 330 on the other hand. DCCP 330 transfers the DCC data between circuit 324 and a TCC processor (TCCP) 340. TCCP 340 is connected to non-volatile memory 310 (a flash memory in some embodiments) and a volatile random access memory 350.

In some embodiments, all or part of memories 310 or 350 are part of TCCP processor 340 (e.g. are internal processor registers).

East optical interface card 210.5 is controlled by an OCn processor (OCnP) 360. Card 210.5 transfers data between circuit 324 and optical fiber link 140.2. West optical interface card 210.2 has a similar construction. Links 140.2, 140.4 may or may not have the same OCn speed. For example, link 140.2 may be an OC12 link, and link 140.4 may be an OC48 link with only OC12 bandwidth provisioned.

The K bytes path is from link 140.4 through card 210.2, circuit 324, and card 210.5, to link 140.2. The K bytes also travel in the opposite direction. The K bytes are also passed back and forth between circuit 324 and cross connect card 210.4 controlled by a cross connect processor (XCONP) 380.

In some embodiments, each of processors 340, 330, 360, 380 is of type MC850 or MC860 available from Motorola, Inc., a US corporation. In some embodiments, each of the processors executes a multitasking operating system of type Vxworks (trademark) available from Wind River Systems of Alameda, Calif. However, the invention is not limited to any number or type of processors, any operating system, or even to a software implementation.

Figure 4:
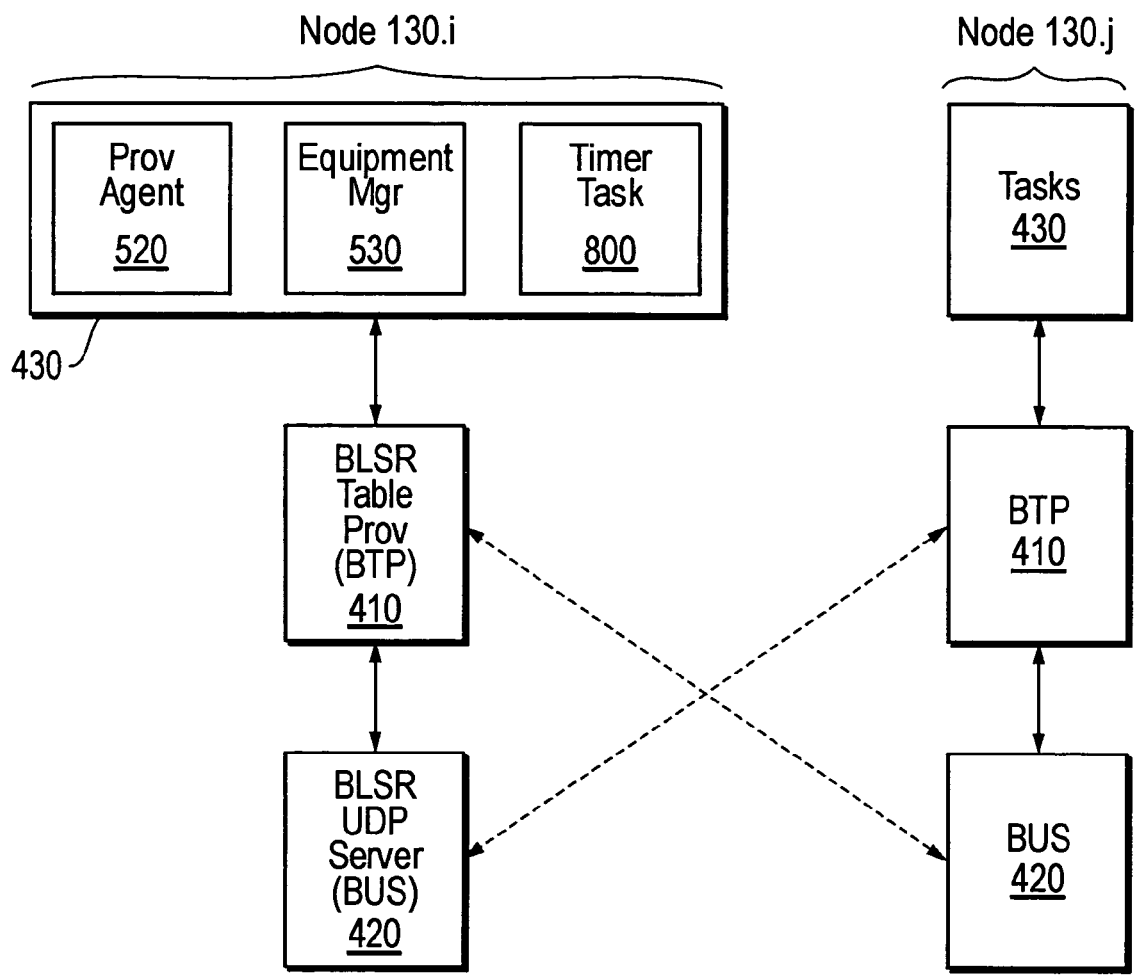
FIG. 4 is a block diagram illustrating software tasks executed by the nodes of FIG. 1.

FIG. 4 illustrates software tasks executed by TCCPs 340 on nodes 130.i, 130.j in some VxWorks embodiments. Each task is scheduled for execution on TCCP 340 based on the task's priority. Task rescheduling can take place when an interrupt or a kernel call occurs.

The ring map and the squelch and payload tables (Tables 1, 2 and 3 above) are constructed by BLSR Table Provisioning (BTP) task 410 and BLSR UDP server task 420 of each node 130. Within each node 130, different tasks executed on the same processor communicate via VxWorks pipes. Tasks executed on different processors communicate via VxWorks sockets.

Table generation involves communication with other nodes. BTP task 410 of each node communicates with UDP servers 420 of other nodes over UDP (User Datagram Protocol) which runs over PPP (point-to-point protocol) implemented over section DCC channels. UDP and PPP are described in W. R. Stevens, "TCP/IP Illustrated," Volume 1 (1994) incorporated herein by reference.

Each ring node 130 also executes a number of other tasks 430 described in Addendum A.

The invention is not limited to any particular protocols, tasks, to pipes, sockets, or to multitasking.

We now describe one table generation embodiment in more detail. Portions of this embodiment are described in pseudocode in Addendum B. Portions of the C language source code are in Appendix A. For convenience, this embodiment will be described on the example of node 130.1. An outline of the description below follows.

Outline

I. Table Generation Steps

Step TGS.1. User Provides Provisioning Information to the Node
- TGS.1A. Ring ID.
- TGS.1B. Node ID.
- TGS.1C. IP address.
- TGS.1D. Cross connect table.
- TGS.1D-1. xcSrcPort.
- TGS.1D-2. xcSrcSts.
- TGS.1D-3. stsType.
- TGS.1E. DCC enable information.
- TGS.1E-1. A flag "DCC enabled".
- TGS.1E-2. The slot number of a card 210.
- TGS.1E-3. The port number of a SONET port.

Step TGS.2. Node 130.1 Constructs Local Table Entries
- TGS.2A. Provisioning agent 520 sends the information TGS.1A through TGS.1E to BTP task 410.
- TGS.2B. BTP task 410 constructs local payload table entries.
- TGS.2C. BTP task 410 creates ELSIT and WLSIT.
- TGS.2D. BTP task 410 starts the UDP server.

Step TGS.3. Ring Map Generation
- TGS.3A. One or more tasks 430 construct a routing table.
- TGS.3B. Equipment manager 530 passes to BTP task 410 a "raw routing table".
- TGS.3C. BTP task 410 creates a "refined routing table".
- TGS.3C-1. The node's IP address.
- TGS.3C-2. Whether the node is reachable through the East or West interface.
- TGS.3C-3. The number of hops.
- TGS.3D. BTP task 410 sends requests to all the nodes for node and ring IDs.
- TGS.3E. The BTP task 410 constructs a ring map.
- TGS.3F. Node 130.1 presents the ring map to the user for approval.
- TGS.3G. The user has approved the ring map.
- TGS.3G-1. Node 130.1 puts the ring map into use.
- TGS.3G-2. Node 130.1 sends the new ring map to other nodes.
- TGS.3H. A node receives the ring map from node 130.1.

Step TGS.4. Construct Squelch and Payload Tables
- TGS.4A. Squelch Table
- TGS.4A-1. BTP task 410 sends requests to the other nodes to get their ELSITs and WLSITs.
- TGS.4A-2. WLSIT from the East neighbor node received.
- TGS.4A-3. ELSIT from the West neighbor is received.
- TGS.4A-4. A request is sent out to the next node.
- TGS.4A-5. WLSIT is received from a node other than the neighbor node on the East interface.
- TGS.4A-6. ELSIT is received from a node other than the neighbor node on the West interface.
- TGS.4A-7. Steps TGS.4A-5, TGS.4A-6 are repeated.
- TGS.4B. Payload Table (see Table 3).
- TGS.4B-1. Node 130.1 sends requests to other nodes for their local payload table entries.
- TGS.4B-2. A node responds.
- TGS.4B-3. All the nodes have responded.

II. Session Management
- SM.1. Sending a request
- SM.2. Responding to requests
- SM.3. Processing of responses
- SM.4. Timers III. Updates III-A. Update Operations
- UP.1. BTP task 410 receives new provisioning information.
- UP.1A. Ring ID has changed.
- UP.1A-1. All sessions are terminated.
- UP.1A-2. Steps TGS.3D through TGS.3F are repeated.
- UP.1A-3. The new ring map is approved by the user.
- UP.1B. Node ID has changed:
- UP.1B-1. All sessions are terminated.
- UP.1B-2. The old node ID is replaced with the new node ID.
- UP.1B-3. The new node ID is sent to the other nodes.
- UP.1C. Local cross connect table 510 has changed:
- UP.1C-1. All sessions are terminated.
- UP.1C-2. Step TGS.2 is repeated.
- UP.1C-3. Send the updated local payload table entries to all the nodes in the ring map.
- UP.1C-4. Send notification to all the other nodes in the ring map that the cross connect table on node 130.1 has changed.
- UP.1C-5. Regenerate the squelch table.
- UP.2. UDP task 420 receives a notification from another node that the other node's node ID has changed.
- UP.3. UDP task 420 on node 130.1 receives a notification from another node that the other node's cross connect table 510 has changed.
- UP.3A. All sessions are terminated.
- UP.3B. The squelch table is regenerated.
- UP.4. BTP task 410 receives a new raw routing table.
- UP.4A. All sessions are terminated.
- UP.4B. BTP task 410 generates a new ring map.
- UP.4C. The new ring map is approved by the user.
- UP.4C-1. Step TGS.4G is performed.
- UP.4C-2. The BTP task regenerates the squelch and payload tables.
- UP.5. UDP task 420 receives a new ring map from another node (UP.4C-1).
- UP.5A. The ring map is copied.
- UP.5B. All sessions are terminated.
- UP.5C. The squelch and payload tables are regenerated.

III-B. Queuing of Updates
- UQ.1. The TCCP processor 340 has been booted.
- UQ.1A. The BTP task receives a raw routing table at TGS.3B. If the first provisioning has not been done:
- UQ.1A-1. BTP task sets the neRouteUpdateQ flag 826.
- UQ.1A-2. BTP task saves the raw routing table.
- UQ.1B. BTP task gets the provisioning information at TGS.2A. The first provisioning has not yet been done.
- UQ.2. BTP task receives provisioning information, and the first provisioning has already been done.
- UQ.2A. There is no ongoing update, and the node ID has changed:
- UQ.2A-1. The node ID update is initiated.
- UQ.2A-2. If the local cross connect table has also changed, step UP.1C is queued.

UQ.2B. If an ongoing update is in progress, then:
   UQ.2B-1. If the node ID has changed, and the ongoing update cause is NODE_ID_MODIFICATION, then:
     UQ.2B-1A. The node ID modification is re-started.
     UQ.2B-1B. If the local cross connect table 510 has also changed, step UP.1C is queued.
   UQ.2B-2. The ongoing update cause is LOCAL_XC_MODIFICATION, and the local cross connect table has changed.
   UQ.2B-3. If the update cause is RM_MODIFICATION, and the node ID has changed, then:
     UQ.2B-3A. The ring map modification processing is interrupted to perform the node ID update UP.1B.
     UQ.2B-3B. The rmModifQ flag 828 is set.
   UQ.2B-4. All cases other than those considered in UQ.2B-1, UQ.2B-2, and UQ.2B-3.
     UQ.2B-4A. Node ID has changed.
     UQ.2B-4B. Local cross connect table has changed.
UQ.3. BTP task 410 receives a new raw routing table.
UQ.4. Node 130.1 receives a remote cross connect table change notification.
UQ.5. An update is completed.

I. Table Generation Steps

The table generation includes the following steps (performed in the order shown or some other order; some steps may overlap):

TGS.1. The user provides provisioning information to the node 130.1.

TGS.2. Node 130.1 constructs local table entries (describing the node itself) for the payload and squelch tables (Tables 2 and 3 above).

TGS.3. Node 130.1 constructs a ring map (Table 1 above).

TGS.4. Node 130.1 constructs the squelch and payload tables.

We now describe each of these steps in more detail.

Step TGS.1

User Provides Provisioning Information to the Node

The human user provides the following information via computer 150 (FIG. 1):

TGS.1A. The ring ID of ring 120. The ring ID is a number assigned by the user. This number allows one to distinguish different SONET rings. A special ring ID value (or a number of values) is reserved for non-ring nodes (node 130.0 can be such a node).

TGS.1B. The node ID (i.e. "1") of node 130.1.

TGS.1C. The IP address (10.5.1.5) of node 130.1. In some embodiments, the IP address is hardwired in the node (for example, in a boot ROM). The user can change the IP address.

Figure 5:
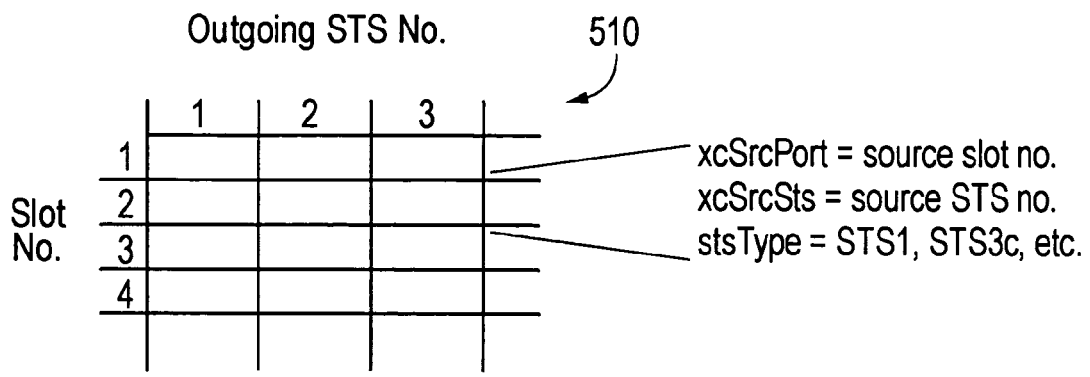
FIG. 5 illustrates a data structure in the node of FIG. 2.

TGS.1D. Cross connect information describing the STSs on node 130.1. Node 130.1 organizes this information in a cross connect table 510 (FIG. 5). Table 510 is a two-dimensional array indexed by a slot number and an outgoing STS number. The slot number identifies a card 210. For example, in nodes of type Cerent 454, the slot number is the number of a slot in backplane 220 (FIG. 2). Each card 210 is plugged into one slot, and thus is identified by the slot number.

In some embodiments, cross connect table 510 has entries only for traffic cards such as 210.1, 210.2, 210.5. Table 510 does not have entries for the TCC and cross connect cards 210.3 and 210.4. Therefore, the slot number index for table 510 is a logical index for convenience. Each logical index corresponds to a unique physical slot number.

In nodes of type Cerent 454, Release 1.0, one slot is reserved for the East interface card 210.5, and one slot is reserved for the West interface card 210.2. While non-ring interfaces can be provided through any one of several slots, the East and West interfaces are provided only through their reserved slots. Hence, the East and West interface slot numbers are the same on each Cerent 454 node, and they are known to the TCCP software. In other embodiments, the East and West slots are not reserved. The East and West slot numbers are provided to node 130.1 by the user or some other means. For 4-fiber BLSRs, a separate card 210, and hence a separate slot, can be used for each of the four East and West interfaces on the node. The slot numbers can be provided by the user.

For each slot number "S", and each outgoing STS number "STSN" of an STS provisioned for this slot (i.e. for the corresponding card 210), the corresponding entry of cross connect table 510 stores the following fields:

TGS.1D-1. xcSrcPort. This is the source slot number in node 130.1, i.e. the slot number of a card 210 whose incoming STS is connected to the outgoing STS STSN in slot S.

Of note, in some embodiments, traffic between different cards 210 within node 130 is based on an STS format, even if one of the cards is a non-SONET card.

Format conversion is performed as needed.

TGS.1D-2. xcSrcSts. This is the source STS number, i.e. the number of the corresponding incoming STS on card "xcSrcPort". The incoming STS "xcSrcSts" is connected to the outgoing STS "STSN" in slot S.

TGS.1D-3. stsType. This field indicates the type of STS "STSN", for example, STS1, STS3C, etc.

TGS.1E. DCC enable information. Nodes 130 use section DCC channels for internode communication to construct routing tables and the squelch and payload tables. Each SONET frame has three section DCC bytes. These bytes are concatenated to form a 192 Kbytes per second channel in each direction on each SONET port.

The user can specify, for each SONET port, whether or not the corresponding 192 KByte/sec DCC channel is enabled. If the DCC channel is enabled, the node software assigns a logical DCC number to the channel (e.g. from 0 upward).

Using the DCC enable information, the node software also constructs a DCC assignment table. One example of the DCC assignment table is Table 4 below. The table is indexed by the logical 192 KBytes/sec. channel number. For each logical channel number, the table includes the following fields:

TGS.1E-1. A flag indicating if this channel is enabled.

TGS.1E-2. The slot number of a card 210 to which the channel is assigned.

TGS.1E-3. The port number of the SONET port to which the channel is assigned. Some OCn cards may have more than one SONET ports.

TABLE 4

DCC ASSIGNMENT TABLE

| Logical 192 KBytes/sec DCC Channel Number | DCC Channel Enabled? | Slot Number Assigned to This DCC Channel | Port Number Assigned to This DCC Channel |
|---|---|---|---|
| 0 | Yes | 1 | 1 |
| 1 | No | Don't care | Don't care |
| ... | ... | ... | ... |

In some embodiments, the user can enter the above information via computer 150. In other embodiments, when a node is first configured, the user must enter the above information for each node via a computer connected to the node; subsequent changes to that information can be entered remotely via a computer not connected to the node.

Once the user has entered the information TGS.1A through TGS.1E, this information (including the DCC assignment table) is transferred to node 130.1 through node 130.4 over the section DCC interface. One or more tasks 430 (FIG. 4) write the information TGS.1A through TGS.1E to memory 310 or 350. In particular, the ring ID (TGS.1A), the node ID (TGS.1B), the IP address information (TGS.1C), and the cross connect table 510 are stored in non-volatile memory 310. This information can be quickly recovered if the TCC card 210.3 is rebooted (in the event of power failure, for example).

Step TGS.2

Node 130.1 Constructs Local Table Entries

TGS.2A. Provisioning agent 520 (one of tasks 430; see FIG. 4) sends the information TGS.1A through TGS.1E to BTP task 410 via a pipe.

In response, BTP task 410 constructs local table entries as follows:

TGS.2B. BTP task 410 constructs local payload table (Table 3) entries for node 130.1, e.g. the entries describing the outgoing STS's for node 130.1. These entries are constructed from the cross connect table 510 (FIG. 5). More particularly, the stsType fields TGS.1D-3 for the slot numbers of the East and West interface cards 210.5, 210.2 are inserted into the respective payload table entries (procedure blsrTblCreateLocalPayldTblEntry).

TGS.2C. BTP task 410 creates East and West local STS information tables (ELSIT and WLSIT). The tables are created by procedure blsrTblFindInsertedSts. In that procedure, the tables are called eastInsStsTbl and westInsStsTbl respectively. The tables are created from the cross connect table 510 (FIG. 5). For each STS number "i" on the East or West interface, entry 2i in the ELSIT or WLSIT describes the outgoing STS number "i", and entry 2i+1 describes the incoming STS number "i". The tables include the following information:

TABLE 5

(ELSIT OR WLSIT)

| Entry Number | Flag | Source STS | Destination STS |
|---|---|---|---|
| ... | ... | ... | ... |
| 2i | "Added" or "Passthrough-outgoing" or "Unassigned-entry" | If Flag = "Passthrough-outgoing", source STS | i |
| 2i + 1 | "Dropped" or "Passthrough-incoming" or "Unassigned-entry" | i | If Flag = "Passthrough-incoming", destination STS |
| ... | ... | ... | ... |

Thus, for each outgoing STS number "i" on the East interface, the ELSIT table includes (entry 2i):

TGS.2C-1. A flag indicating if the STS is added on node 130.1, or is a passthrough STS from the West interface. (The STS is added if the cross connect table source slot number xcSrcPort (TGS.1D-1) is other than the West interface slot number. The STS is passthrough if xcSrcPort equals the West interface slot number.)

TGS.2C-2. If the STS is passthrough from the West interface, the corresponding incoming STS number (source STS number) on the West interface.

TGS.2C-3. The number "i" of the STS itself.

For each incoming STS number "i" on the East interface, the ELSIT table includes (entry 2i+1):

TGS.2C-4. A flag indicating if the STS is dropped on node 130.1, or is passed through to the West interface. This is determined by examining the source slot numbers xcSrcPort (TGS.1D-1) of the outgoing STSs for cards other than the East interface card 210.5. If "i" equals an xcSrcPort for the West interface slot, the STS is passthrough. If "i" equals xcSrcPort for any other slot, the STS is dropped. If the STS is both dropped and passed through, the flag indicates the STS is passed through.

TGS.2C-5. The number "i" of the STS itself.

TGS.2C-6. If the STS is passed through to the West interface, the corresponding outgoing STS number (destination STS number) on the West interface.

The WLSIT table contains the same information for the West interface.

TGS.2D. If the UDP server 420 has not been started, BTP task 410 starts the UDP server, since the node 130.1 is now able to provide its local payload table entries (see TGS.2B above) and the ELSIT and WLSIT (TGS.2C) to other nodes 130.

Step TGS.3

Ring Map Generation

TGS.3A. One or more tasks 430 (FIG. 4) construct a routing table. The routing table is constructed and maintained using RIP (Router Information Protocol) or OSPF (Open Shortest Path First protocol), both described in "TCP/IP Illustrated," Volume 1, cited above. RIP or OSPF is run over the section DCC channels. The routing table will contain information on the nodes of ring 120, but may also contain information on other nodes. For example, if a 192 KBytes/sec section DCC channel is enabled between nodes 0 and 2 (FIG. 1), the routing table will contain the information on node 0. BTP task 410 will not insert such nodes into the ring map (Table 1). The ring map will contain only the nodes in ring 120.

TGS.3B. Equipment manager 530 (which is one of tasks 430) passes to BTP task 410 the following information, derived from the routing table. We will call this information a "raw routing table":

TABLE 6

RAW ROUTING TABLE

| Node IP Address | DCC 1 | DCC 2 | DCC 3 | Other DCCs |
|---|---|---|---|---|
| 10.5.1.5 | 0 | 0 | 0 | ... |
| 10.5.2.5 | 1 | 0 | 0 | ... |
| 10.5.3.5 | 2 | 0 | 0 | ... |
| 10.5.4.5 | 2 | 0 | 0 | ... |
| 10.5.5.5 | 0 | 1 | 0 | ... |

In this table, "DCC 1", "DCC 2", and so on, are logical DCC numbers (see TGS.1E above). For each node accessible via a DCC logical number "i", the table gives the node's IP address (in the first column) and the number of hops to this node (in column "DCC i"). There are zero hops from node 1 to itself.

In the raw routing table, "0" hops means the corresponding node is unreachable through that DCC interface. Using this coding, node 130.1 itself is "unreachable" through any DCC interface.

TGS.3C. BTP task 410 creates a "refined routing table" (table blsrRefinedRtTbl in procedure blsrProvProcRawNeRouteUpdate). An example refined routing table is as follows:

TABLE 7

REFINED ROUTING TABLE

| Node IP Address | Interface | Hops |
|---|---|---|
| 10.5.2.5 | East | 2 |
| 10.5.3.5 | East | 3 |
| 10.5.4.5 | East | 3 |
| 10.5.5.5 | West | 2 |

The refined routing table is created from the raw routing table (Table 6 in TGS.3B) and the DCC assignment table (Table 4 in TGS.1E). For each node 130 reachable through more than zero hops on some DCC interface as shown in the raw routing table, the refined routing table includes:

TGS.3C-1. The node's IP address.

TGS.3C-2. Whether the node is reachable through the East or West interface. Actually, the "Interface" column contains the logical slot number of East card 210.5 or West card 210.2 (logical slot numbers are described in TGS.1D above). of note, field TGS.1E-2 (slot number) in the DCC assignment table allows the BTP task to map the logical DCC number into a slot number. The logical DCC number is the DCC corresponding to a positive number of hops in the Raw Routing Table 6.

TGS.3C-3. The number of hops to the node on the interface in TGS.3C-2 (taken from the Raw Routing Table 6).

TGS.3D. BTP task 410 sends requests to all the nodes (all the IP addresses) in the refined routing table (TGS.3C) on respective DCC interfaces, requesting the nodes' node and ring IDs. Depending on each node's response, the BTP task performs as follows:

TGS.3D-1. If the response indicates a ring ID different from the ID of ring 120 (TGS.1A), BTP task 410 eliminates the node from the refined routing table.

TGS.3D-2. If the response indicates a node ID reserved for non-ring nodes (nodes not members of any SONET ring), the BTP eliminates the node from the refined routing table.

Figure 6:
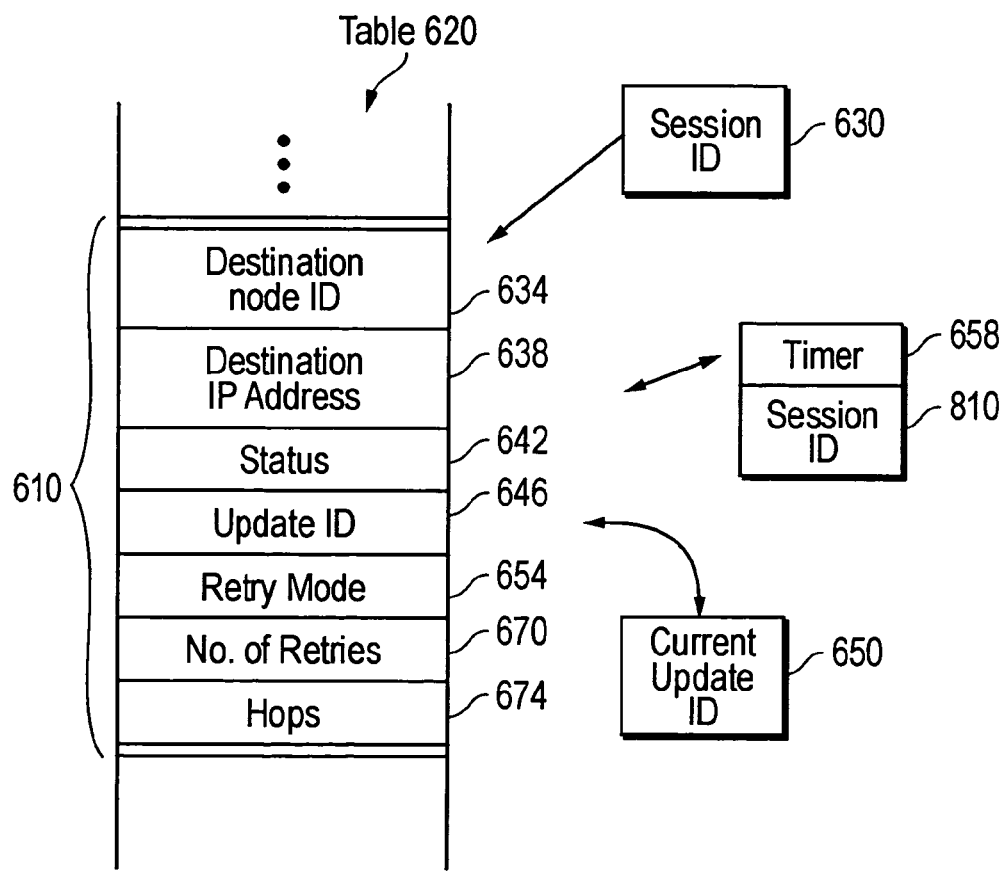
FIG. 6 illustrates data structures and a timer in the node of FIG. 2.

TGS.3D-3. If the node does not respond within a predetermined time period, the request is re-issued as discussed below in connection with FIG. 6.

TGS.3E. After all of the responses have been received, the BTP task 410 constructs a ring map (Table 1) from the responses. The ring map contains only nodes in ring 120.

In some embodiments, the ring map is ordered clockwise using the number of hops and the interface information in the Refined Routing Table 7. The first node in the ring map is node 130.1 itself.

In some embodiments, before the step TGS.3D, the BTP task constructs a different table ("NE list") from the refined routing table. The NE list is indexed using the number of hops and the interface (East or West). For each index, a corresponding pointer points to a linked list of structures each of which describes a node 130 reachable in that number of hops on that interface. Steps TGS.3D and TGS.3E use the NE list. (This is done by procedure blsrTblProcessNeRouteTbl.)

TGS.3F. Before using the ring map, the node 130.1 presents the ring map to the user for approval. If the ring map is not approved, it is discarded.

TGS.3G. If and when the user has approved the ring map,
 TGS.3G-1. Node 130.1 puts the ring map into use, discarding the previous ring map (if any). Node 130.1 also copies the new ring map to its database 320 to protect the ring map against power loss or other failures that could, for example, cause a reboot of the TCP card.
 TGS.3G-2. Node 130.1 also sends the new ring map to all the other nodes in the new ring map.

TGS.3H. When a node "i" receives the ring map from node 130.1 (see TGS.3G-2 above), the node "i" starts using that ring map even if the node "i" previously constructed its own ring map. The ring map used previously by node i is discarded. The new ring map is saved in node i's database 320.

Step TGS.4

Construct Squelch and Payload Tables

TGS.4A. Squelch Table

TGS.4A-1. Once the ring map has been obtained (step TGS.3), BTP task 410 on node 130.1 sends requests to the other nodes in the ring map to get their ELSITs and WLSITs (TGS.2C). More particularly, node 130.1 sends a request to the first node on the East (second node in the ring map, node 130.2 in FIG. 1 and Table 1) asking for the node 130.2 WLSIT. Also, node 130.1 sends a request to the first node on the West (last node in the ring map, node 130.5 in FIG. 1 and Table 1), asking for the node 130.5 ELSIT.

TGS.4A-2. When the WLSIT from the East neighbor node 130.2 is received, node 130.1 (BTP task 410) updates its squelch table (Table 2) with the information from the East neighbor. The update occurs not in the squelch table itself but in intermediate data structures from which the squelch table will be constructed. We will use the following notation for entries in these structures:

SQ[i].E.I will denote the entry corresponding to the squelch table entry for the incoming STS number "i" on the East interface;

SQ[i].E.O will denote the entry corresponding to the squelch table entry for the outgoing STS number "i" on the East interface;

SQ[i].W.I will denote the entry corresponding to the squelch table entry for the incoming STS number "i" on the West interface;

SQ[i].W.O will denote the entry corresponding to the squelch table entry for outgoing STS number "i" on the West interface.

Each entry SQ[i].E.I, SQ[i].E.O, SQ[i].W.I, SQ[i].W.O includes:

TGS.4A-2(a). A node ID field to be ultimately entered into the squelch table; and TGS.4A-2(b). An "STS number" field to keep track of the STSs as described below.

When the WLSIT from the East neighbor is received, each entry WE in the WLSIT is processed as follows:

TGS.4A-2A. If WE's flag (Table 5) is "Added", then the SQ[i].E.I node ID field TGS.4A-2(a) receives the node ID ("2") of node 130.2, where "i" is the "Destination STS" (Table 5) of WE.

TGS.4A-2B. If WE's flag is "Dropped", then the SQ[i].E.O node ID field TGS.4A-2(a) receives the node ID ("2") of node 130.2, where "i" is the "Source STS" of WE.

TGS.4A-2C. If WE's flag is "Passthrough-incoming", then the SQ[i].E.O STS number field TGS.4A-2(b) receives WE's "Destination STS", where "i" is WE's "Source STS".

TGS.4A-2D. If WE's flag is "Passthrough-outgoing", then the SQ[i].E.I STS number field TGS.4A-2(b) receives WE's "Source STS", where "i" is WE's "Destination STS".

TGS.4A-3. When the ELSIT from the West neighbor is received, it is processed similarly to update the entries SQ[i].W.I, SQ[i].W.O for the West interface.

TGS.4A-4. When a WLSIT is received from a node on the East interface, a request for the WLSIT is sent out to the next node on the East interface. Similarly, when an ELSIT is received from a node on the West interface, a request for the ELSIT is sent out to the next node on the West interface.

TGS.4A-5. When a WLSIT is received from a node 130.j other than the neighbor node 130.2 on the East interface, the WLSIT is processed as follows:

TGS.4A-5A. If the SQ[i].E.I STS number TGS.4A-2(b) equals an STS number of an "Added" STS in the WLSIT, then SQ[i].E.I node ID field TGS.4A-2(a) receives the node ID "j" of the node from which the WLSIT has arrived.

TGS.4A-5B. If the SQ[i].E.O STS number TGS.4A-2(b) equals an STS number of a "Dropped" STS in the WLSIT, then SQ[i].E.O node ID TGS.4A-2(a) receives the node ID "j".

TGS.4A-5C. If the SQ[i].E.O STS number TGS.4A-2(b) equals an STS number of a "Passthrough-incoming" STS in a WLSIT entry "WE", then the SQ[i].E.O STS number TGS.4A-2(b) receives WE's "Destination STS".

TGS.4A-5D. If the SQ[i].E.I STS number TGS.4A-2(b) equals an STS number of a "Passthrough-outgoing" STS in a WLSIT entry "WE", then the SQ[i].E.I STS number TGS.4A-2(b) receives WE's "Source STS".

TGS.4A-6. When an ELSIT is received from a node 130.j other than the neighbor node 130.5 on the West interface, steps similar to step TGS.4A-5 are performed to update the entries SQ[i].W.I, SQ[i].W.O.

TGS.4A-7. Steps TGS.4A-5, TGS.4A-6 are repeated until all the nodes have responded with their ELSIT and WLSIT tables. In some embodiments, node 130.1 is also made to respond, i.e. node 130.1 sends a WLSIT request to itself on the East interface, and an ELSIT request to itself on the West interface. In other embodiments, node 130.1 gets its ELSIT and WLSIT without sending a request to itself.

Then the node ID fields TGS.4A-2(a) of entries SQ[i].E.O, SQ[i].E.I, SQ[i].W.O, SQ[i].W.I are copied into the corresponding squelch table entries (Table 2). This completes squelch table generation.

TGS.4B. Payload Table (see Table 3).

TGS.4B-1. Node 130.1 sends requests to all the other nodes in the ring map for their local payload table entries (TGS.2B). In some embodiments, this is done at the same time as the step TGS.4A-1, sending requests for the ELSIT and WLSIT to neighbor nodes.

TGS.4B-2. Whenever a node responds, node 130.1 inserts the response into the node 130.1 payload table.

TGS.4B-3. When all the nodes have responded, the payload table is complete. On node 130.1, TCC card 210.3 sends the payload table to the East and West interface cards 210.5, 210.2 on the same node for use in automatic protection switching.

II. Session Management

BTP task 410 executes an infinite loop, waiting for messages from other tasks on the same node and from the BUS tasks 420 on other nodes, and processing the messages. The messages may come in an arbitrary order. Some messages may get lost and never arrive (this may happen if a node's processor (e.g. TCCP) was rebooted before the node could send the message). Other messages may arrive out-of-date. For example, suppose the BTP task 410 on node 130.1 has sent requests to other nodes for their WLSIT and ELSIT tables and their local payload table entries (steps TGS.4A-1, TGS.4B-1). While BTP task 410 is waiting for responses, the user changes the cross connect table 510 on node 130.1, or another node is inserted into the ring necessitating a change in the routing table. Tasks 430 on node 130.1 send the new provisioning information (including the cross connect table) or the new raw routing table to BTP task 410 (steps TGS.2A, TGS.3B). BTP task 410 processes the new provisioning information and sends new requests to other nodes for their node and ring IDs, or ELSITs and WLSITS, or local payload table entries (steps TGS.3D, TGS.4A-1, TGS.4B-1). As the BTP task 410 is waiting for responses to the new requests, it may receive out-of-date responses to old requests issued before the provisioning information or the routing table changed. Therefore, each node does "session management" to ensure correct processing of messages. The session management will now be explained on the example of node 130.1.

An exchange of messages between the BTP task 410 on node 130.1 and another node is called a session. Each session is identified by an entry 610 (FIG. 6) in a session table 620 in RAM 350. Session ID 630 is an index into the session table. Thus, the session ID identifies an entry 610.

SM.1. Sending a Request

SM.1A. Before sending a request to another node 130.j, BTP task 410 allocates a session table entry 610 and initializes it as follows.

SM.1A-1. Destination node ID field 634 is set to "j" (the destination node ID). Destination IP address 638 is set to the IP address of node 130.j.

SM.1A-2. Status field 642 is set to a value specifying the purpose of the request (for example, "sending a payload table request" for step TGS.4B-1).

SM.1A-3. Update ID 646 is set to a current update ID value 650 corresponding to given provisioning information, a given ring map, and a given routing table. When BTP task 410 receives new provisioning information (step TGS.2A), a new ring map, or a new raw routing table (TGS.3B), BTP task 410 will increment the current update ID 650 in memory 350. The current update ID 650 is inserted into the requests and responses as described below. Responses received with a wrong update ID (different from the current update ID 650) will be discarded by BTP task 410.

SM.1A-4. Retry mode 654 specifies the rate at which the requests should be re-issued if no response has been received within a specified time (measured by timer 658).

SM.1A-5. Number of retries 670 stores the number of times this request has been sent out (one plus the number of times the request has been re-issued; see SM.1A-4).

SM.1A-6. Hops field 674 specifies the number of hops to the destination node 130.*j*.

Figure 7:
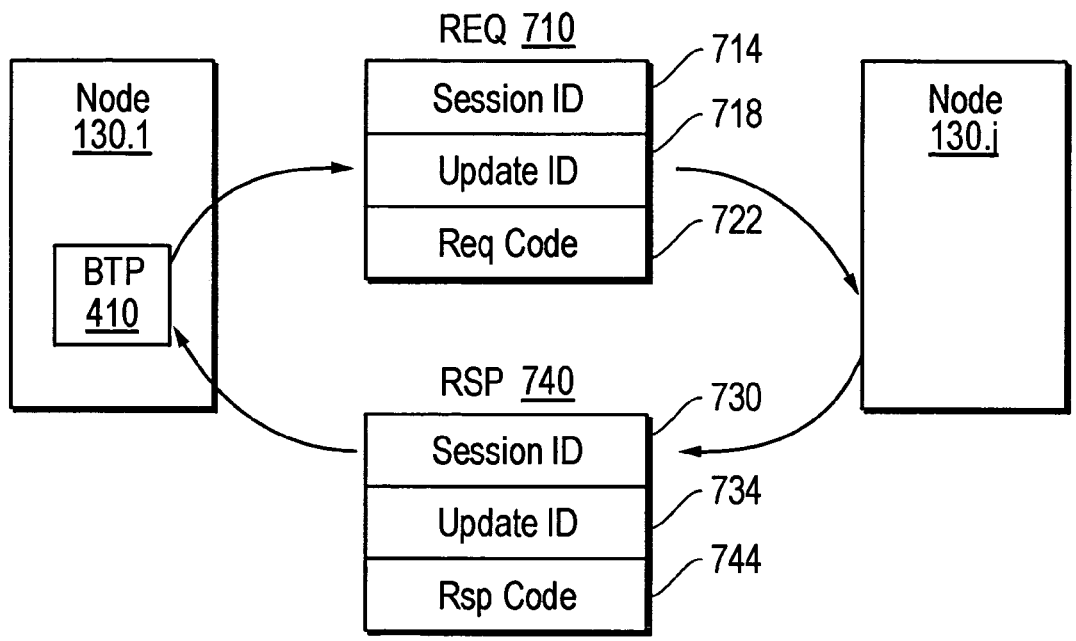
FIG. 7 illustrates data structures of messages exchanged by nodes of FIG. 1.

SM.1B. Each request message 710 (FIG. 7) sent by BTP task 410 includes a header whose fields are initialized by BTP task 410 as follows:

SM.1B-1. Session ID field 714 receives the session ID 630 (FIG. 6) for the corresponding session.

SM.1B-2. Update ID field 718 receives the update ID 646 for the corresponding session.

SM.1B-3. Request code 722 identifies the kind of request and corresponds to the status 642 for the session. For example, if the request is for local payload table entries (step TGS.4B-1), the request code 722 specifies a payload table entry request.

SM.2. Responding to Requests

Destination node 130.*j* (e.g. BUS task 420 on node 130.*j*) copies the session ID field 714 and the update ID field 718 from the request header into the respective fields 730, 734 of the header of response 740. In addition, node 130.*j* sets the response code field 744 of the response header to a value indicating the kind of response. For example, if the request 710 was for local payload table entries, the response code field 744 is set to indicate a payload table response.

SM.3. Processing of Responses

If and when the BTP task 410 on node 130.1 receives the response 740, the BTP task performs the following checking.

SM.3A. The response session ID field 730 is compared to an allowed maximum value. If the maximum value is exceeded, it is presumed that the response 740 was corrupted, and the response is discarded.

SM.3B. The session ID 730 is used as an index into table 620. The corresponding entry 610 is examined.

SM.3B-1. If the update ID 646 in the entry 610 is different from the current update ID 650, the response is presumed outdated and is discarded.

SM.3B-2. If the status field 642 in the entry 610 does not match the response code 744, the response is presumed outdated and is discarded. Of note, when the current update ID 650 is changed, all the entries 610 are deallocated. Deallocation involves writing an "unassigned" value into the status field 642.

If all the checks in SM.3A and SM.3B are passed successfully, the response 740 is assumed to be valid.

Whether or not the checks have been successful, the session table entry 610 identified by the response session ID field 730 is deallocated and becomes available for re-use.

SM.4. Timers

When BTP task 410 sends the request 710 (SM.1), a timer 658 is started. The timers are managed by timer task 800 (FIG. 4). When BTP task 410 sends the request, the BTP task also sends a message to timer task 800. The message includes the session ID 630 and the retry mode value 654 for the session. The retry mode determines the time the timer is to measure. The timer task allocates and starts the timer. The timer task stores the session ID in a field 810 (in RAM 350) associated with the timer.

When the response 740 is received and the session table entry is deallocated (SM.3), BTP task 410 requests the timer task to deallocate the corresponding timer.

If the timer expires before the response 740 is received, the timer task sends the session ID 810 to BTP task 410. The session IDs received from the timer task are processed by BTP task 410 executing the procedure blsrTblProcessTmr (Addendum B and Appendix A). The processing depends on the status 642 value in the corresponding entry 610. In some cases, the request 710 is re-issued. When the request is re-issued, the same session (the same session ID) is used, and the timer is restarted. In some embodiments, the timer is deallocated whenever it expires, and a timer is allocated whenever the request is re-issued.

The time for which the timer is set, and the processing performed when the timer expires, differ depending on the status field 642 and the number of retries 654. In some cases, the requests are re-sent (re-issued) frequently (i.e. the timer is set for a short amount of time) up to some predetermined number of retries. Then the requests are sent less frequently (the timer is set for a longer time) after the predetermined number of retries. The predetermined number of retries may depend on the status field 642. This flexibility is achieved by using a connectionless protocol such as UDP. Other embodiments use TCP. Some TCP implementations allocate timers themselves for each TCP connection. The TCP implementation software resends a message when the respective TCP "retransmission" timer expires. See "TCP/IP Illustrated" volume 1, cited above. The TCP software varies the time periods measured by the retransmission timer according to a predetermined algorithm. Some TCP implementations do not allow an application (such as BTP task 410) to control the time measured by the retransmission timer, or even to be informed when the retransmission timer expires. Hence, UDP is advantageous in some embodiments.

Another advantage of using a connectionless protocol such as UDP is not tying system resources while waiting for a response. BTP task 410 sends each request 710 over a separate VxWorks socket. As soon as the request is sent, BTP task 410 deallocates the socket. Therefore, the socket is not tied up to wait for acknowledgment as would be the case with TCP. All the responses 740 are sent to the same single socket used by BTP task 410 for all nodes 130. The network software on node 130.1 does not have to keep track of open TCP connections. Further, messages are not fragmented (as they could be with TCP).

III. Updates

III-A. Update Operations

Information used to generate the ring map and the squelch and payload tables may change. For example, the user may change the ring or node ID, the cross connect table 510, or any other provisioning information described in TGS.1 above. The ring map and the routing table may also change. The data on node 130.1 are then updated as follows.

UP.1. Suppose the BTP task 410 receives new provisioning information from the provisioning agent 520 on node 130.1 (see TGS.1 above). Then BTP task 410 compares the new ring ID (TGS.1A), the new node ID (TGS.1B), and the new cross connect table 510 (TGS.1D) with the old ring ID, node ID, and cross connect table which are currently in use.

UP.1A. If the ring ID has changed,

UP.1A-1. All the sessions are terminated. Thus, all session table entries 610 and all timers 658 are deallocated. The current update ID 650 is incremented (or reset to zero if it is at a maximum value). Thus, any responses to outstanding requests will be discarded.

UP.1A-2. Steps TGS.3D through TGS.3F are repeated. Thus, BTP task 410 generates a new ring map from the previously constructed refined routing table (Table 7).

UP.1A-3. If and when the new ring map is approved by the user, step TGS.3G is performed, and the squelch and payload tables are regenerated as in step TGS.4.

UP.1B. If the node ID has changed, BTP task 410 performs the following operations (procedures blsrProvProcessDb, blsrProvProcessNodeIdModif):
  UP.1B-1. All the sessions are terminated, and the current update ID 650 is incremented or reset to zero (step UP.1A-1 is performed).
  UP.1B-2. The old node ID is replaced with the new node ID in the ring map (Table 1) and the squelch table (Table 2).
  UP.1B-3. The new node ID is sent to all the other nodes 130.*j* in the ring map. (A new session is created for each message carrying the node ID to another node, as described above in part II.)
UP.1C. If the local cross connect table 510 has changed, BTP task 410 performs the following operations (procedures blsrProvProcessDb, blsrProvProcessXcModif):
  UP.1C-1. All the sessions are terminated, and the current update ID 650 is incremented or reset to zero (step UP.1A-1 is performed).
  UP.1C-2. Step TGS.2 is repeated. In particular, the squelch table is re-initialized, and the local table entries (including the WLSIT and the ELSIT) are regenerated. The payload table is not re-initialized; only the local entries in the payload table are updated.
  UP.1C-3. Send the updated local payload table entries to all the nodes 130 in the ring map (procedure blsrTblSendUpdateToAllNodes). The nodes will update their own payload tables when they receive the updated entry.
  UP.1C-4. Send notification to all the other nodes in the ring map (Table 1) that the cross connect table on node 130.1 has changed. The nodes will regenerate their own tables as described below in UP.3.
  UP.1C-5. Regenerate the squelch table as in step TGS.4A.
UP.2. Suppose the UDP task 420 receives a notification from another node that the other node's node ID has changed (see UP.1B-3). UDP task 420 changes the old node ID to the new node ID in the squelch table (Table 2), the session table 620 (FIG. 6), and the ring map (Table 1) of node 130.1.
UP.3. Suppose the UDP task 420 on node 130.1 receives a notification from another node that the other node's cross connect table 510 has changed (see UP.1C-4). The UDP task informs BTP task 410 on node 130.1. In response, the BTP task performs the following operations (procedure blsrProvProcessXcChngNotif):
  UP.3A. All the sessions are terminated, and the current update ID 650 is incremented or reset to zero (step UP.1A-1 is performed).
  UP.3B. The squelch table (Table 2) is re-initialized and regenerated as described in TGS.4A.
UP.4. If the BTP task 410 receives a new raw routing table (Table 6) from tasks 430 (procedure blsrProvProcessNeRouteUpdate), the BTP task performs as follows:
  UP.4A. All the sessions are terminated, and the update ID 650 is incremented or reset to zero (step UP.1A-1 is performed).
  UP.4B. BTP task 410 generates a new ring map as in steps TGS.3C through TGS.3F.
  UP.4C. If and when the new ring map is approved by the user,
    UP.4C-1. Step TGS.4G is performed. Thus, the new ring map is put into use and is sent to all the other nodes in the new ring map. The other nodes perform operations described in UP.5.
    UP.4C-2. The BTP task regenerates the squelch and payload tables as in step TGS.4 (procedure blsrProvProcessRmModif).
UP.5. If UDP task 420 on node 130.1 receives a new ring map from another node (UP.4C-1), the UDP task sends a pipe message to BTP task 410. BTP task 410 performs the following operations:
  UP.5A. The ring map from the message is copied into the ring map for node 130.1 (procedure blsrProvProcessPeerRmUpdateNotif). The user is not asked to approve the ring map since the approval was given to the other node at step UP.4C before the ring map was sent to node 130.1.
  UP.5B. All the sessions are terminated, and the update ID 650 is incremented or reset to zero (step UP.1A-1 is performed; see procedure blsrProvProcessRmModif).
  UP.5C. The squelch and payload tables are regenerated as in step TGS.4.

III-B. Queuing of Updates

Figure 8:
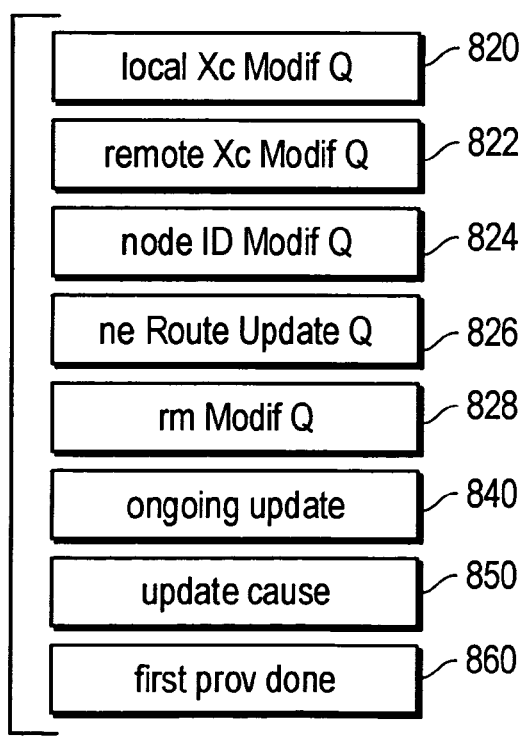
FIG. 8 illustrates data stored in the node of FIG. 2.

Sometimes an update cannot be performed before another update is completed. In this case, an update may be queued to be performed later. FIG. 8 illustrates update queues 820-828 for one embodiment. Each queue is implemented as a flag in RAM 350, indicating that an update is to be performed later. The queues will be explained on the example of node 130.1.

In FIG. 8, the queues are as follows:

Queue 820 (flag "localXcModifQ") indicates an update is pending (queued) due to a receipt of a new local cross connect table 510 from provisioning agent 520 on node 130.1 (UP.1C).

Queue 822 (flag "remoteXcModifQ") indicates an update is pending due to a receipt of a cross connect table change notification from another node 130 (UP.3).

Queue 824 (flag "nodeIdModifQ") indicates an update is pending due to a receipt of a new node ID from provisioning agent 520 on node 130.1 (UP.1B).

Queue 826 (flag "neRouteUpdateQ") indicates an update is pending due to a receipt of a new raw routing table from a task 430 on node 130.1 (UP.4).

Queue 828 (flag "rmModifQ") indicates the ring map has been changed for some reason, and hence the squelch and payload tables are to be regenerated (as in steps TGS.4, UP.4C). This is processed by procedure blsrProvProcessRmModif.

When any particular update is completed, BTP task 410 (procedure blsrProvProcessDoneEvent) checks the flags 820-828 and initiates another update as needed.

RAM 350 also stores the following variables:

(1) "Ongoing update" flag 840 indicates that an update is in progress.

(2) "Update cause" indicator 850 indicates the reason for the ongoing update. Possible values may include:
  RM_MODIFICATION (ring map modification is being processed);
  LOCAL_XC_MODIFICATION (local cross connect table modification, see UP.1C above);
  REMOTE_XC_MODIFICATION (remote cross connect table modification, see UP.3 above);
  NODE_ID_MODIFICATION (node ID modification, see UP.1B above)
  NE_ROUTE_UPDATE (routing table modification, see UP.4 above).

Updates are queued by BTP task 410 as follows.

UQ.1. When the TCCP processor 340 has been booted, tasks 430 send to BTP task 410 the provisioning information (TGS.2A) and the raw routing table (TGS.3B). The BTP may receive the raw routing table before the provisioning information.

UQ.1A. When the BTP task receives a raw routing table at TGS.3B, the BTP task checks if the first provisioning has been done (flag 860 (blsrFirstProvisioningDone) in procedure blsrProvProcessNeRouteUpdate; stored in RAM 350). If the first provisioning has not been done, the BTP does not construct the ring map or the squelch or payload tables. Thus, steps TGS.3C through TGS.3H and TGS.4 are skipped. However:

UQ.1A-1. The BTP task sets the neRouteUpdateQ flag 826.

UQ.1A-2. The BTP task also saves the raw routing table in a local storage in memory 350 for later use.

UQ.1B. When the BTP task gets the provisioning information at TGS.2A, if the first provisioning has not yet been done (as indicated by flag 860), the BTP task checks the neRouteUpdateQ flag 826 (procedure blsrProvProcessDb). If the flag is set, the BTP generates the ring map and the squelch and payload tables (steps TGS.3C through TGS.3H and TGS.4) using the raw routing table saved at UQ.1A-2.

UQ.2. When the BTP task 410 receives provisioning information, and the first provisioning has already been done, update step UP.1 is performed as described above. We now describe some details of step UP.1.

The new provisioning information may indicate that both the node ID and the cross connect table have changed. Further, the new provisioning information may arrive when another update is in progress. Therefore, at UP.1:

UQ.2A. If there is no ongoing update ("ongoing update" flag 840 is reset), and the node ID has changed, then UQ.2A-1. The node ID update is initiated as described above at UP.1B. In particular, the new node ID is sent to other ring nodes (UP.1B-3).

UQ.2A-2. If the local cross connect table has also changed, step UP.1C (local cross connect table update) is not performed at this time, but is queued by setting the localXcModifQ flag 820. The local cross connect table update UP.1C will be initiated later (procedure blsrProvProcessDoneEvent) when the node 130.1 has received acknowledgments from all the other ring nodes 130.j that they have received the new node ID from node 130.1 (see UP.1B-3 above; see also UQ.5, paragraph (6), and UQ.5D, below).

UQ.2B. If an ongoing update is in progress ("ongoing update" flag 840 is set), then:

UQ.2B-1. If the node ID has changed as indicated by the new provisioning information, and the ongoing update cause indicator 850 is NODE_ID_MODIFICATION, then:

UQ.2B-1A. The node ID modification is re-started, i.e. step UP.1B is re-started from the beginning. In particular, the new node ID is sent to all the nodes at UP.1B-3.

UQ.2B-1B. If the local cross connect table 510 has also changed, step UP.1C (local cross connect table update) is not performed at this time, but is queued by setting the localXcModifQ flag 820, as in UQ.2A-2.

UQ.2B-2. If the ongoing update cause indicator 850 is LOCAL_XC_MODIFICATION, and the local cross connect table has changed, the local cross connect table update UP.1C is re-initiated. No other updates in step UP.1 are performed at this time, no matter what other changes the new provisioning information contains.

UQ.2B-3. If the update cause indicator 850 is RM_MODIFICATION (ring map modification is being processed), and the node ID has changed, then:

UQ.2B-3A. The ring map modification processing is interrupted to perform the node ID update UP.1B. In particular, the "update cause" 850 is set to NODE_ID_MODIFICATION. Also, all sessions will be terminated at UP.1B-1.

UQ.2B-3B. The rmModifQ flag 828 is set to queue the ring map modification processing. This processing will be initiated again later (procedure blsrProvProcessDoneEvent) when the node 130.1 has received acknowledgments from all the other ring nodes 130.j that they have received the new node ID from node 130.1 (see UP.1B-3 above; see also UQ.5 below).

UQ.2B-4. In all cases other than those considered in UQ.2B-1, UQ.2B-2, and UQ.2B-3, the ongoing update is allowed to proceed, and no new update is initiated. However, UQ.2B-4A. If the node ID has changed, the nodeIdModifQ flag 824 is set to queue the node ID update.

UQ.2B-4B. If the local cross connect table has changed, the localXcModifQ flag 820 is set to queue the local cross connect table update.

UQ.3. When the BTP task 410 receives a new raw routing table, step UP.4 is performed described above. In that step, if the first provisioning has been done (flag 860 is set), then before performing the raw routing table update (before step UP.4A), the BTP checks the ongoing update flag 840. If this flag is set, and the update cause indicator 850 indicates any update except NE_ROUTE_UPDATE, the ongoing update is interrupted and is queued to be performed later. Thus, if the update cause is RM_MODIFICATION, then the rmModifQ flag 828 is set. If the update cause is LOCAL_XC_MODIFICATION, the localXcModifQ flag 820 is set; and so on.

UQ.4. When node 130.1 receives a remote cross connect table change notification from another node (UP.3), the BTP task on node 130.1 checks the ongoing update flag 840. If the ongoing update is in progress (flag 840 is set), and the update cause indicator 850 is other than REMOTE_XC_MODIFICATION, a new update is not started but is queued to be performed later. This means, steps UP.3A and UP.3B are skipped, and the remoteXcModifQ flag 822 is set. The ongoing update is allowed to continue.

If the cause indicator 850 is REMOTE_XC_MODIFICATION, step UP.3 is re-started from the beginning.

UQ.5. When any update is completed, BTP task 410 executes its "process done event" procedure blsrProvProcessDoneEvent which checks if any updates are queued. More particularly, this procedure is called in the following cases:

(1) Node 130.1 has sent its local payload table entries to all the other nodes in the ring map (step UP.1C-3), and has received acknowledgments from all the nodes.

(2) Node 130.1 has sent cross connect table change notifications to all the other nodes in the ring map (step UP.1C-4), and node 130.1 has received requests from all the other nodes for its cross connect table information (its WLSIT and ELSIT; the other nodes' BTP tasks send such requests at their steps UP.3B).

(3) Node 130.1 has received a new ring map and sent requests to all the other ring map nodes for their payload table entries (step UP.5C; see also TGS.4B-1), and node 130.1 has received responses from all the nodes.

(4) Node 130.1 has sent requests for WLSITs and ELSITs to other ring nodes, and has received responses from all the nodes. See step TGS.4A-7.

(5) Node 130.1 has sent requests to all nodes in the refined routing table for their node and ring IDs (step TGS.3D), and has received all the responses.

(6) The node ID of node 130.1 has changed. Node 130.1 has sent its new node ID to all the other nodes in the ring map (step UP.1B-3), and has received acknowledgments from all the other nodes.

(7) Node 130.1 has received a new ring map from the user, has sent it to all the other nodes members of the new ring map, and has received acknowledgments from all the nodes. The new ring map was provided to node 130.1 with provisioning information update (step UP.1). The new ring map may have been provided because the user decided to generate the ring map manually, or because the user had received a new ring map for approval and had approved the new ring map (steps UP.1A-3, UP.4C).

(8) BTP task 410 on node 130.1 has received a message from the XC card 210.4 on node 130.1 that the XC card is ready to do protection switching if needed. BTP task 410 has sent a message to all the other ring nodes that the node 130.1 is ready for protection switching, and has received acknowledgments from all the nodes.

The process done event procedure blsrProvProcessDoneEvent handles the queues 820-828 as follows:

UQ.5A. If the rmModifQ flag 828 is set (indicating that a new ring map has been received), then the squelch and payload tables are regenerated. This is done by calling procedure blsrProvProcessRmModif to perform steps UP.5B and UP.5C. Before step UP.5B, the localXcModifQ flag 820 and the remoteXcModifQ flag 822 are reset since the updates corresponding to these flags will be performed as part of steps UP.5B and UP.5C.

UQ.5B. If the rmModifQ flag 828 is reset but the remoteXcModifQ flag 822 is set, steps UP.3A and UP.3B are performed to regenerate the squelch table (procedure blsrProvProcessXcChngNotif).

UQ.5C. If the rmModifQ flag 828 and the remoteXcModifQ flag 822 are reset but the nodeIdmodifQ flag 824 is set, steps UP.1B-1 through UP.1B-3 are performed to update the node ID in all the ring nodes (procedure blsrProvProcessNodeIdModif).

UQ.5D. If the rmModifQ flag 828, the remoteXcModifQ flag 822, and the nodeIdModifQ flag 824 are reset but the localXcModifQ flag 820 is set, update steps UP.1C-1 through UP.1C-5 are performed.

The embodiments described above illustrate but do not limit the invention. The invention is not limited to the number or any particular type of nodes. The invention can be applied to rings having VT capability, and possibly to non-BLSR rings. In some embodiments, the invention is applied to an SDH network or to some other kind of network, known or to be invented. The invention is not limited to optical links or networks. In some embodiments, one or more links 140 include electrical links on which a transport signal conforms to a SONET STS or SDH STM format. In some embodiments, computer 150 is other than a personal computer. Link 160 may be a non-LAN link. In some embodiments, when a new ring map is generated or received from another node, the new ring map is put into use without soliciting the user's approval (see e.g. TGS.3F, UP.1A-3, UP.4C). In some embodiments, additional user approval is solicited at steps such as TGS.3H. The invention is not limited to using intermediate data structures (e.g., SQ[i].E.I., etc. in TGS.4A-2) or any other data structures. IP addresses may be replace with other kinds of addressing information. The tables can be implemented with arrays, linked lists, or other types of data structures. Other embodiments and variations are within the scope of the invention, as defined by the appended claims.

ADDENDUM A

Tasks Executed by the TCC Processor

Some VxWorks tasks executed by the TCC processor 340 are listed below. The task priority is also given. Lower priority numbers indicate higher priorities.

BTP task 410 has priority 160.

BUS server task 420 has priority 145.

Timer task 800 has priority 150.

Database management tasks (priority 190) manage the database 320.

A flash disk management task (priority 145) provides access to flash memory 310 for the data base management tasks.

Provisioning agent task 520 (priority 190) distributes data from database 320 to other tasks on the TCCP 340.

A provisioning manager task (priority 140) sends provisioning information to provisioning agents on other cards 210 of the node.

Equipment manager task 530 (priority 135) routes messages between different cards and processors on the node. In particular, this task routes the UDP frames to and from DCCP 330. The messages between cards are routed through equipment agent tasks on running on the cards.

An equipment agent task (priority 150) routes messages between the TCC and other cards on the node. the messages are routed through the equipment manager task (described above).

A TL1 manager task has priority 150. A TL1 agent task has priority 151. These tasks provide TL1 user interface to the node. TL1 is described in W. J. Goralski, "SONET" (1997). The TL1 manager task listens for connections and spawns TL1 agent tasks to handle client sessions. The TL1 manager maintains a central registry for all clients and other common information (e.g. card slot state for PLUGIN/UNPLUG message). Each TL1 agent is responsible for receiving all incoming TL1 command (AKA request) messages from the client, processing the request, forming a response message (if necessary), and sending the appropriate response to the client. Multiple TL1 agents are used to allow each client/user a dedicated execution context. The TL1 manager task is also the central repository for all event notifications that may result in Autonomous messages. It will format the message (in tl1AutoMsg) and then send the message out the appropriate output port. In addition, for those commands that may take an inordinate amount of time, the TL1 manager can act as a central registry of all active commands in the system, so RTRV-CMD-STAT can be implemented.

A BRM (bridging request manager) provisioning task (priority 160) processes ring bridge requests.

A switching agent task (priority 111) handles switching over the redundant TCC card if the active TCC card fails.

A Web server task (priority 200) communicates with a user running a Wide World Web browser on a computer or terminal if a computer or terminal is connected to the node.

An alarm agent task (priority 180) collects alarms on the TCC card.

An alarm collector task (priority 140) collects alarm conditions from alarm agent tasks running on different cards, processes them (e.g., assigns the severities) and passes them to an event manager task (priority 130). The event manager task maps alarms and events generated by the cards to objects that handle particular alarms and events.

A fan poll task (priority 255) polls fans (not shown) used for cooling the node. A fan manager task (priority 150) takes an appropriate action if a fan is not working. An appropriate action may include sending a message to the fan tray to provide a visual alarm signal to a human operator.

A fault manager task (priority 150) polls other tasks running on the same TCCP. If a task is not responding to a poll, the fault manager may restart the task or reboot the TCCP.

A temp manager task (priority 150) displays an alarm if the system temperature is too high.

An SNMP trap daemon task (priority 150) allows the user to manage the node via SNMP. SNMP (Simple Network Management Protocol) is described in the aforementioned book "TCP/IP Illustrated", Volume 1.

ADDENDUM B

Procedure blsrTblProcessTmr

Parameter—timer message

Get the session ID 810 from the timer message.

Examine the status field 642 in the corresponding entry 620.
If the status is SENDING_PAYLD_TBL_REQ (sending a payload table request)
    Increment the retries field 670.
    Call blsrTblSendPayldTblReq to resend the request.
    If the retry mode field 654 is FAST_RATE (indicating a fast retry rate) and the retries field 670 is at a maximum value for the number of the fast retries,
        Set the retry mode to indicate a slow rate.
        Set the retries field to zero.
        Set variable blsrOutOfSyncAlmState to indicate an alarm.

Else if the status is SENDING_PAYLD_TBL_UPDATE (sending payload table update)
    Increment the retries field 670.
    Call blsrTblSendPayldTblUpdate to resend the request.
    If the retry mode field 654 is FAST_RATE (indicating a fast retry rate) and the retries field is at a maximum value for the number of the fast retries,
        Set the retry mode to indicate a slow rate.
        Set the retries field to zero.
        Set variable blsrOutOfSyncAlmState to indicate an out of synchronization alarm.

Else if the status is SENDING_XC_TBL_REQ_TO_EAST (sending request for XC information (WLSIT) on the East interface)
    Increment the retries field 670.
    If "retries" has reached a maximum value MAX_SQUELCH_RETRIES, set variable blsrOutOfSyncAlmState to indicate an out of synchronization alarm.
    Call blsrTblSendXcTblReqToEastNode to resend the request at the rate specified by the retry mode.

Else if the status is SENDING_XC_TBL_REQ_TO_WEST (sending request for XC information (ELSIT) on the West interface)
    Perform processing similar to the case when the status is SENDING_XC_TBL_REQ_TO_WEST, described above (but call blsrTblSendXcTblReqToWestNode to resend the request).

Else if the status is SENDING_XC_TBL_CHNG_NOTIF (sending XC table change notification)
    Perform processing similar to the case SENDING_PAYLD_TBL_REQ described above, but call a different procedure—blsrTblSendXcChngNotif—to resend the message.

Else if the status is SENDING_NODE_ID_REQ (sending a node ID request)
    Increment the retries field.
    Call blsrTblSendNodeIdReq to resend the request.
    No alarm is set. The node may have been removed from the ring.

Else if the status is SENDING_NODE_ID_UPDATE (sending node ID update)
    Perform processing similar to the case SENDING_PAYLD_TBL_REQ described above, but call a different procedure—blsrTblSendNodeIdUpdate to resend the message.

Else if the status is SENDING_RM_UPDATE_REQ (sending ring map update request)
    Perform processing similar to the case SENDING_PAYLD_TBL_REQ described above, but call a different procedure—blsrTblSendRmUpdateReq—to resend the message.

Else if the status is SENDING_RDY_TO_ENBL_SW_REQ (sending a message indicating that this node is ready to for automatic protection switching)
    Increment the retries field.
    Call blsrTblSendRdyToEnblSwReq to resend the request.

The invention claimed is:

1. A method comprising:
identifying a plurality of nodes of a network, wherein said plurality of nodes are interconnected by one or more links;
executing one or more tasks within each of said plurality of nodes of said network, wherein said executing comprises
    requesting, from at least one other node of said plurality of nodes, a format of data transmitted over a link of said one or more links attached to said at least one other node of said plurality of nodes,
    generating first data identifying at least one node of said plurality of nodes at which at least one of
        inserted data is added, wherein
            said inserted data is associated with said each of said plurality of nodes, and
        dropped data is dropped, wherein
            said dropped data is associated with said each of said plurality of nodes, and
    generating second data indicating a format of in-transit data transmitted over said one or more links;
identifying a destination node of said in-transit data; and
transmitting said in-transit data to said destination node using said first data and said second data.

2. The method of claim 1, wherein
said inserted data comprises data received by said each of said plurality of nodes from said network, and
said dropped data comprises data transmitted from each of said plurality of nodes to said network.

3. The method of claim 1, wherein said executing comprises requesting at least one of:
said inserted data from said node of said plurality of nodes at which said inserted data is added; and
said dropped data from said node of said plurality of nodes at which said dropped data is dropped.

4. The method of claim 1, wherein said requesting comprises:
    requesting at least one of a synchronous transport signal type and a synchronous transport module type.
5. The method of claim 1, wherein said network satisfies at least one of a first condition and a second condition, wherein said first condition is a failure,
    in a case of said first condition, said in-transit data is switched from a failed link of said one or more links to a redundant link of said one or more links, and squelched, and
    in a case of said second condition, said in-transit data is re-transmitted in data buckets to at least one predetermined node of said plurality of nodes at regular intervals of time.
6. The method of claim 5, wherein
    said network satisfies said first condition, and
    said executing one or more tasks within each of said plurality of nodes to generate said first data comprises preventing misconnection by performing squelching.
7. The method of claim 5, wherein
    said network satisfies said second condition, and
    said executing one or more tasks within each of said plurality of nodes to generate said first data comprises
        for each data bucket, identifying at least one of
            said plurality of nodes at which said inserted data is added via said each data bucket, and
        said plurality of nodes at which said dropped data is dropped via said each data bucket.
8. The method of claim 1, further comprising:
    detecting a failure on a first link of said one or more links, wherein said in-transit data is communicated over said first link;
    identifying a redundant link of said one or more links; and
    switching traffic in response to said detecting by switching said in-transit data from said first link to said redundant link.
9. The method of claim 8, wherein said executing one or more tasks within each of said plurality of nodes comprises:
    executing said one or more tasks within each of said plurality of nodes before said failure occurs.
10. An apparatus comprising:
    means for identifying a plurality of nodes of a network, wherein said plurality of nodes are interconnected by one or more links;
    means for executing one or more tasks within each of said plurality of nodes, wherein means for executing comprises
        means for requesting, from at least one other node of said plurality of nodes, a format of data transmitted over a link of said one or more links attached to said at least one other node of said plurality of nodes,
        means for generating first data identifying at least one node of said plurality of nodes at which at least one of inserted data is added, wherein
            said inserted data is associated with said each of said plurality of nodes, and
        dropped data is dropped, wherein
            said dropped data is associated with said each of said plurality of nodes, and
        means for generating second data indicating a format of in-transit data transmitted over said one or more links, and
    said inserted data and said dropped data comprise at least one of data received by said each of said plurality of nodes from said network, and
        data transmitted by said each of said plurality of nodes to said network;
    means for identifying a destination node of said in-transit data; and
    means for transmitting said in-transit data to said destination node using said first data and said second data.
11. The apparatus of claim 10, wherein said means for executing comprises:
    means for requesting said inserted data from said node of said plurality of nodes at which said inserted data is added; and
    means for requesting said dropped data from said node of said plurality of nodes at which said dropped data is dropped.
12. The apparatus of claim 10, wherein said means for requesting comprises:
    means for requesting at least one of a synchronous transport signal type and a synchronous transport module type.
13. The apparatus of claim 10, wherein
    said network satisfies at least one of a first condition and a second condition, wherein said first condition is a failure,
        in a case of said first condition, said in-transit data is switched from a failed link of said one or more links to a redundant link of said one or more links, and squelched, and
        in a case of said second condition, said in-transit data is re-transmitted in data buckets to at least one predetermined node of said plurality of nodes at regular intervals of time.
14. The apparatus of claim 13, wherein
    said means for generating said first data comprises
        means for preventing misconnection comprising means for performing squelching, if said network satisfies said first condition.
15. The apparatus of claim 13, wherein
    said means for generating said first data comprises means for identifying, for each data bucket, at least one of
        at least one of said plurality of nodes at which said inserted data is added via said each data bucket, and
        at least one of said plurality of nodes at which said dropped data is dropped via said each data bucket.
16. The apparatus of claim 10, further comprising:
    means for detecting a failure on a first link of said one or more links, wherein said in-transit data is communicated over said first link;
    means for identifying a redundant link of said one or more links; and
    means for switching traffic in response to said detecting by switching said in-transit data from said first link to said redundant link.
17. The apparatus of claim 16, wherein said means for executing one or more tasks within each of said plurality of nodes comprises:
    means for executing said one or more tasks within each of said plurality of nodes before said failure occurs.
18. A network node comprising:
    an interface, wherein
        said interface is configured to couple said network node to a network,
        said network comprises a plurality of nodes interconnected by one or more links, and
        said plurality of nodes comprises said network node; and
    a timing communications and control processor configured to identify said plurality of nodes,
        execute one or more tasks within network node, wherein said timing communications and control processor is configured to perform said execution by virtue of being configured to
request, from at least one other node of said plurality of nodes, a format of data transmitted over a link of said one or more links attached to said at least one other node of said plurality of nodes,
generate first data identifying at least one node of said plurality of nodes at which at least one of inserted data is added, wherein
said inserted data is data associated with said each of said plurality of nodes, and
dropped data is dropped, wherein
said dropped data is data associated with said each of said plurality of nodes, and
generate second data indicating a format of in-transit data transmitted over said one or more links, and
said inserted data and said dropped data comprise at least one of
data received by said each of said plurality of nodes from said network, and
data transmitted by said each of said plurality of nodes to said network,
identify a destination node of said in-transit data, and
communicate said in-transit data to said destination node using said first data and said second data.

19. The network node of claim 18, wherein said timing communications and control processor is further configured to:
request, from at least one other node of said plurality of nodes, said inserted data from said node of said plurality of nodes at which said inserted data is added and said dropped data from said node of said plurality of nodes at which said dropped data is dropped.

20. A machine-readable storage medium having a plurality of instructions executable by a machine embodied therein, wherein said plurality of instructions when executed are configured to cause said machine to perform a method comprising:
identifying a plurality of nodes of a network, wherein said plurality of nodes are interconnected by one or more links;
executing one or more tasks within each of said plurality of nodes to
request, from at least one other node of said plurality of nodes, a format of data transmitted over a link of said one or more links attached to said at least one other node of said plurality of nodes,
generate first data identifying at least one node of said plurality of nodes at which at least one of
inserted data is added, wherein
said inserted data is associated with said each of said plurality of nodes, and
dropped data is dropped, wherein
said dropped data is associated with said each of said plurality of nodes, and
generate second data indicating a format of in-transit data transmitted over said one or more links;
identifying a destination node of said in-transit data; and
communicating said in-transit data to said destination node using said first data and said second data.

21. The machine-readable storage medium of claim 20, wherein said insert data and said dropped data comprise at least one of:
data received by said each of said plurality of nodes from said network, and
data transmitted by said each of said plurality of nodes to said network.

22. The machine-readable storage medium of claim 21, wherein said executing comprises:
requesting, from at least one other node of said plurality of nodes, said inserted data from said node of said plurality of nodes at which said inserted data is added and said dropped data from said node of said plurality of nodes at which said dropped data is dropped.

* * * * *

UNITED STATES PATENT AND TRADEMARK OFFICE
CERTIFICATE OF CORRECTION

PATENT NO. : 7,646,722 B1
APPLICATION NO. : 10/725709
DATED : January 12, 2010
INVENTOR(S) : Neuendorff et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1035 days.

Signed and Sealed this

Twenty-eighth Day of December, 2010

David J. Kappos
*Director of the United States Patent and Trademark Office*